US009338320B2

(12) United States Patent
Haga et al.

(10) Patent No.: US 9,338,320 B2
(45) Date of Patent: May 10, 2016

(54) IMAGE FORMING APPARATUS AND METHOD OF CONTROLLING THE SAME

(71) Applicant: Konica Minolta, Inc., Tokyo (JP)

(72) Inventors: Tatsuyoshi Haga, Tokyo (JP); Mikimasa Honma, Tokyo (JP); Shuichi Ito, Tokyo (JP); Yuji Uchida, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/956,135

(22) Filed: Jul. 31, 2013

(65) Prior Publication Data

US 2014/0043634 A1 Feb. 13, 2014

(30) Foreign Application Priority Data

Aug. 10, 2012 (JP) .................. 2012-178983
Aug. 10, 2012 (JP) .................. 2012-178986

(51) Int. Cl.
G06F 3/12 (2006.01)
H04N 1/00 (2006.01)
G06F 9/455 (2006.01)

(52) U.S. Cl.
CPC ........ H04N 1/00904 (2013.01); G06F 9/45545 (2013.01); G06F 2009/45575 (2013.01)

(58) Field of Classification Search
None
See application file for complete search history.

(56) References Cited

U.S. PATENT DOCUMENTS

| | | | |
|---|---|---|---|
| 2006/0133362 A1* | 6/2006 | Stein et al. ............... | 370/360 |
| 2008/0079974 A1* | 4/2008 | Ferlitsch ............... | 358/1.13 |
| 2009/0316176 A1* | 12/2009 | Fujimori et al. .......... | 358/1.13 |
| 2010/0115315 A1* | 5/2010 | Davis et al. ............... | 713/323 |
| 2010/0214586 A1* | 8/2010 | Suzuki ............... | 358/1.13 |
| 2011/0060924 A1* | 3/2011 | Khodorkovsky .......... | 713/300 |

FOREIGN PATENT DOCUMENTS

| | | |
|---|---|---|
| JP | 2007-164421 | 6/2007 |
| JP | 2007-318421 | 12/2007 |
| JP | 2009-201092 | 9/2009 |
| JP | 2009-223695 | 10/2009 |
| JP | 2010-191543 | 9/2010 |
| JP | 2010-271863 | 12/2010 |

(Continued)

OTHER PUBLICATIONS

Notification of Reasons for Refusal for application No. JP 2012-178983, dispatched Dec. 3, 2014, 4 pgs.

(Continued)

Primary Examiner — Vincent Rudolph
Assistant Examiner — Richa Mishra
(74) Attorney, Agent, or Firm — Squire Patton Boggs (US) LLP

(57) ABSTRACT

An image forming apparatus includes a printer unit to form an image and outputting the image on a sheet, a storage unit, a control unit to control hardware resources of the image forming apparatus including at least the printer unit and the storage unit by executing a first OS that is activated on the image forming apparatus and a control program operating on the first OS and that can execute second to N-th OSs that activate at least one application and an emulator disposed between the first OS and the second to N-th OSs to allow the second to N-th OSs to operate on the first OS, wherein the control unit can cause the first OS to enter into a sleep mode and inhibits the first OS from entering into the sleep mode when at least one of the second to N-th OSs is active.

34 Claims, 26 Drawing Sheets

(56) References Cited

FOREIGN PATENT DOCUMENTS

| | | | |
|---|---|---|---|
| JP | 2011-060055 | | 3/2011 |
| JP | 2011-060238 | | 3/2011 |
| JP | 2011060238 | A * | 3/2011 |
| JP | 2011-145912 | | 7/2011 |
| JP | 2011-192130 | | 9/2011 |
| JP | 2011-253475 | | 12/2011 |
| JP | 4900530 | | 3/2012 |

OTHER PUBLICATIONS

Translation of the Notification of Reasons for Refusal for application No. JP 2012-178983, dispatched Dec. 3, 2014, 4 pgs.
Notification of Reasons for Refusal for application No. JP 2012-178986, dispatched Dec. 3, 2014, 4 pgs.
Translation of the Notification of Reasons for Refusal for application No. JP 2012-178986, dispatched Dec. 3, 2014, 4 pgs.

* cited by examiner

IMAGE FORMING APPARATUS AND METHOD OF CONTROLLING THE SAME

BACKGROUND OF THE INVENTION

1. Field of the Invention

The present invention relates to an image forming apparatus that includes a printer unit that forms an image based on image data and outputs the image on a sheet and a method of controlling the same.

2. Description of the Related Art

An image forming apparatus such as a printer, a facsimile, a copier, and a multi-function machine having these functions has a function of forming an image based on image data and outputting the image on a sheet. The function is generally realized by firmware that operates on an operating system (OS) and controls hardware of the image forming apparatus.

Further, an apparatus that can operate a plurality of OSs is known as an apparatus that processes information (for example, see Japanese Unexamined Patent Application Publication Nos. 2009-223695, 2010-191543, and 2011-192130).

Japanese Unexamined Patent Application Publication No. 009-223695 proposes an apparatus that is connected to a plurality of external apparatuses and executes processes according to a processing request and that can select whether images will be processed by hardware or software according to the content of processing or the number of processes to be executed.

Japanese Unexamined Patent Application Publication No. 2010-191543 proposes an emulator that includes a virtual OS1 that operates controller software and an OS2 that operates operating unit software and that handles communication between the controller and the operating unit as communication between the OS1 and OS2.

Japanese Unexamined Patent Application Publication No. 2011-192130 proposes an image forming apparatus that includes two OSs having different priorities and that has a plurality of OSs that allocate hardware resources according to an execution priority.

Further, Japanese Unexamined Patent Application Publication No. 2011-060238 discloses an information processing apparatus such as a digital multi-function machine that has a power saving mode where only a first OS is activated and that releases the memory of a second OS during the power saving mode so that power is not supplied to the memory block of the second OS, and switches the activation of the second OS according to a wake-up factor from a network.

In the image forming apparatus, a technique of controlling the image forming apparatus using a plurality of OSs is known (see Japanese Unexamined Patent Application Publication Nos. 2010-191543, 2011-192130, and 2011-060238). Examples of the apparatus control include storage of image data in a HDD, management of heat fusing temperature, and control of sensors that detect opening or closing of a tray or a door as well as control of scanning and printing.

An image forming apparatus that receives document file data edited by an application of an external apparatus or the like so that the document files can be output based on the data is known. However, document files are stored as files of the format that is unique to the application or of a specific format, and print setting is performed using a driver that operates on the operating system of the external apparatus. Thus, when document data of the Word (trademark) format is printed, the application and a printer driver are required, and a job is input to the image forming apparatus as output data by a printer driver included in the external apparatus.

However, in the related art, the of OS mounted on the image forming apparatus are provided for the purpose of controlling the apparatus only, and an image forming apparatus that includes an OS that handles output data (of the format Word, Excel (both are trademarks), and the like) is not known. Thus, when a user tries to change the content of input data, since only data that has been rasterized (subjected to Raster Image Processing (RIP)) is present in the image forming apparatus, it is thus difficult to perform a process such as editing output data on the image forming apparatus. Therefore, the user has to perform the operation in front of a PC in which the original data (Word) is stored even if the operation involves a small change. Further, there is another problem in that after a file is edited on the PC, the edited data has to be transmitted to the image forming apparatus again, which consumes time and effort.

In addition, in a multi-OS environment of an image forming apparatus or the like that mounts a plurality of OSs, a sleep process is turned on and off according to the conditions of the overall control of a first operating system. Although Japanese Unexamined Patent Application Publication No. 2011-0238 discloses an information processing apparatus having the power saving mode where only the first OS is activated, there is no special mention of the sleep process in the overall control.

However, if the sleep process is performed according to the conditions of the overall control of the first operating system, an engine may enter into a sleep mode with the determination on the first OS even when the second and subsequent OSs are being used. Thus, there is a problem in that the time may be consumed to warm up the engine when starting printing from the second OS, which may deteriorate operation efficiency. On the other hand, there is another problem in that power consumption increases due to activation of an unnecessary OS unless the sleep process is performed efficiently.

In addition, in a multi-OS environment of an image forming apparatus or the like that mounts a plurality of OSs, allocation of hardware resources is determined smoothly according to priority of an OS. However, when an OS (including applications such as PhotoShop (trademark; the same hereinbelow)) that run on Windows (trademark; the same hereinbelow)) intended for general users used in recent years is adapted to be used in an image forming apparatus, since just maintaining the activation state thereof consumes many hardware resources, it is difficult to perform a print process stably just by changing the allocation of hardware resources. Although Japanese Unexamined Patent Application Publication No. 2011-060238 discloses an information processing apparatus having a power saving mode where only the first OS is activated, the information processing apparatus enters into the power saving mode if an event where a packet is not received, an event where an engine unit does not operate, or an event where an operation is not received from an operating unit is detected and continues for a predetermined period or longer, whereas the information processing apparatus does not enter into the power saving mode if any one of these operations is present. Thus, in the apparatus of Japanese Unexamined Patent Application Publication No. 2011-060238, it is difficult to suppress consumption of hardware resources under the multi-OS environment and to secure a stable print process.

The invention has been made in view of the above problems, and an object of the invention is to provide an image forming apparatus and a method of controlling the same capable of activating second to N-th (N is an integer of 2 or more) operating systems different from a first operating system and reducing the warm-up time due to the sleep process under a multi-OS environment to improve processing efficiency.

Another object of the invention is to provide an image forming apparatus and a method of controlling the same capable of operating second to N-th (N is an integer of 2 or more) different from a first operating system that operates a control program for controlling the apparatus and allowing a stable print process using limited hardware resources.

SUMMARY OF THE INVENTION

To achieve at least one of the above-mentioned objects, according to an aspect of the invention, there is provided an image forming apparatus including:

a printer unit that forms an image based on image data and outputs the image on a sheet;

a storage unit; and a control unit to control hardware resources of the image forming apparatus including at least the printer unit and the storage unit by executing a first operating system that is activated on the image forming apparatus and a control program operating on the first operating system and that can execute second to N-th (N is an integer of 2 or more) operating systems that activate at least one or more applications and an emulator that is disposed between the first operating system and the second to N-th operating systems to allow the second to N-th operating systems to operate on the first operating system, wherein the control unit can cause the first operating system to enter into a sleep mode and inhibits the first operating system from entering into the sleep mode when at least one of the second to N-th operating systems is active.

In the image forming apparatus, it is preferable that the second to N-th operating systems can activate at least one or more applications that handle data.

In the image forming apparatus, it is preferable that the control unit inhibits the first operating system from entering into the sleep mode when any one of the second to N-th operating systems is active and at least one or more of the applications is active.

In the image forming apparatus, it is preferable that the control unit inhibits the first operating system from entering into the sleep mode when any one of the second to N-th operating systems is active and at least one or more of the applications that are registered is active.

In the image forming apparatus, it is preferable that the control unit causes an engine of the printer unit to enter into a sleep mode while maintaining the first operating system in the active state when any one of the second to N-th operating systems is active and only an application other than the registered applications among the applications is active.

In the image forming apparatus, it is preferable that the control unit enables the first operating system to enter into the sleep mode when any one of the second to N-th operating systems is active and the applications are not active.

In the image forming apparatus, it is preferable that the apparatus further includes an operating unit that accepts an input operation, and the control unit enables the applications to be set and registered through the operating unit.

In the image forming apparatus, it is preferable that the control unit causes an engine of the printer unit to enter into a sleep mode when the first operating system enters into the sleep mode.

In the image forming apparatus, it is preferable that the control unit can cause the second to N-th operating systems to enter into a sleep mode.

In the image forming apparatus, it is preferable that the control unit has a power saving mode in which an engine of the printer unit enters into a sleep mode without causing the first operating system to enter into the sleep mode.

In the image forming apparatus, it is preferable that the control program allows or inhibits entering into the sleep mode.

In the image forming apparatus, it is preferable that the control unit causes the first operating system to enter into the sleep mode when predetermined conditions are satisfied and any one of the second to N-th operating systems is not operating.

In the image forming apparatus, it is preferable that the predetermined conditions are a case where no operation has been performed on the image forming apparatus for a predetermined period in an idle state of no job.

In the image forming apparatus, it is preferable that at least one of the second to N-th operating systems can directly access at least a portion of the hardware resources and can access, via the first operating system, the hardware resources including hardware resources that the second to N-th operating systems can not directly access.

In the image forming apparatus, it is preferable that the control unit realizes the outputting of the printer unit by executing a printer driver that operates on at least one of the second to N-th operating systems to control the printer unit.

In the image forming apparatus, it is preferable that when data handled by the second to N-th operating systems is output in the image forming apparatus controlled by the first operating system, the data is input, as a job, to the image forming apparatus that is controlled by the first operating system through the printer driver.

In the image forming apparatus, it is preferable that the printer driver is be intended to be provided for used in a personal computer.

To achieve at least one of the above-mentioned objects, according to another aspect of the invention, there is provided a method of controlling an image forming apparatus including: a printer unit that forms an image based on image data and outputs the image on a sheet; and a storage unit.

the method controlling hardware resources of the image forming apparatus including at least the printer unit and the storage unit by executing a first operating system that is activated on the image forming apparatus and a control program operating on the first operating system, the method including the steps of:

executing second to N-th (N is an integer of 2 or more) operating systems that activate at least one or more applications and an emulator that is disposed between the first operating system and the second to N-th operating systems to allow the second to N-th operating systems to operate on the first operating system; and causing the first operating system to enter into a sleep mode, wherein the first operating system is inhibited from entering into the sleep mode when at least one of the second to N-th operating systems is active.

In the method of controlling the image forming apparatus, it is preferable that the second to N-th operating systems can activate at least one or more applications that handle data.

In the method of controlling the image forming apparatus, it is preferable that the first operating system is inhibited from entering into the sleep mode when any one of the second to N-th operating systems is active and at least one or more of the applications is active.

In the method of controlling the image forming apparatus, it is preferable that the first operating system is inhibited from entering into the sleep mode when any one of the second to N-th operating systems is active and at least one or more of the applications that are registered is active.

In the method of controlling the image forming apparatus, it is preferable that an engine of the printer unit is caused to enter into a sleep mode while maintaining the first operating system in the active state when any one of the second to N-th operating systems is active and only an application other than the registered applications among the applications is active.

In the method of controlling the image forming apparatus, it is preferable that the first operating system is caused to enter into the sleep mode when any one of the second to N-th operating systems is active and the applications are not active.

In the method of controlling the image forming apparatus, it is preferable that the image forming apparatus includes an operating unit that accepts an input operation, and the applications are be set and registered through the operating unit.

In the method of controlling the image forming apparatus, it is preferable that an engine of the printer unit is caused to enter into a sleep mode when the first operating system enters into the sleep mode.

In the method of controlling the image forming apparatus, it is preferable that the second to N-th operating systems can enter into a sleep mode.

In the method of controlling the image forming apparatus, it is preferable that the image forming apparatus can enter a power saving mode in which an engine of the printer unit enters into a sleep mode without causing the first operating system to enter into the sleep mode.

In the method of controlling the image forming apparatus, it is preferable that the control program allows or inhibits entering into the sleep mode.

In the method of controlling the image forming apparatus, it is preferable that the first operating system is caused to enter into the sleep mode when predetermined conditions are satisfied and any one of the second to N-th operating systems is not operating.

In the method of controlling the image forming apparatus, it is preferable that the predetermined conditions are a case where no operation has been performed on the image forming apparatus for a predetermined period in an idle state of no job.

In the method of controlling the image forming apparatus, it is preferable that at least one of the second to N-th operating systems can directly access at least a portion of the hardware resources and can access, via the first operating system, the hardware resources including hardware resources that the second to N-th operating systems can not directly access.

In the method of controlling the image forming apparatus, it is preferable that the outputting of the printer unit is realized by executing a printer driver that operates on at least one of the second to N-th operating systems to control the printer unit.

In the method of controlling the image forming apparatus, it is preferable that when data handled by the second to N-th operating systems is output to the image forming apparatus controlled by the first operating system, the data is input, as a job, to the image forming apparatus that is controlled by the first operating system through the printer driver.

In the method of controlling the image forming apparatus, it is preferable that the printer driver is intended to be provided for used in a personal computer.

BRIEF DESCRIPTION OF THE DRAWINGS

FIG. 5 is a flowchart illustrating the procedure of overall control during power-ON;

DETAILED DESCRIPTION OF THE PREFERRED EMBODIMENTS

Hereinafter, an image forming apparatus according to an embodiment of the invention will be described based on the accompanying drawings.

Figure 26:
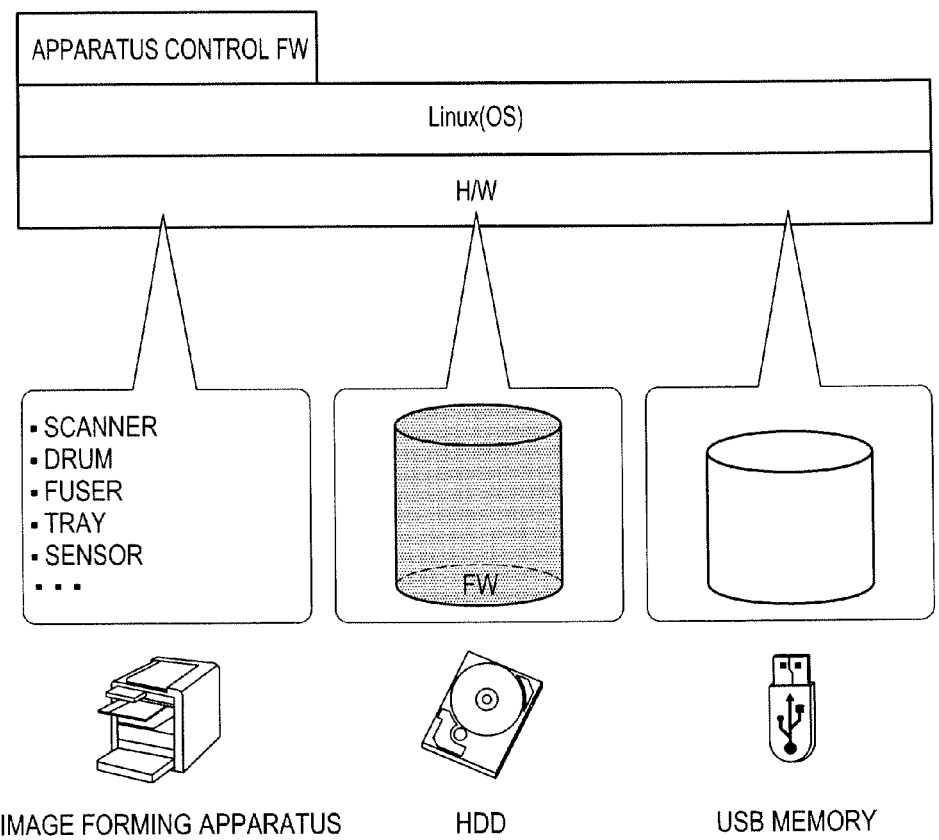
FIG. 26 is a diagram illustrating an outline of a software configuration and hardware resources of a conventional image forming apparatus.

As illustrated in FIG. 26, a conventional image forming apparatus has a configuration in which an OS (for example, Linux (trademark; the same hereinbelow) that activates apparatus control firmware is mounted on hardware, and the apparatus control firmware is activated on the OS, whereby the apparatus is controlled. Examples of the apparatus control include storage of image data in a HDD, management of heat fusing temperature, and control of sensors that detect opening or closing of a tray or a door as well as control of scanning and printing.

Figure 1:
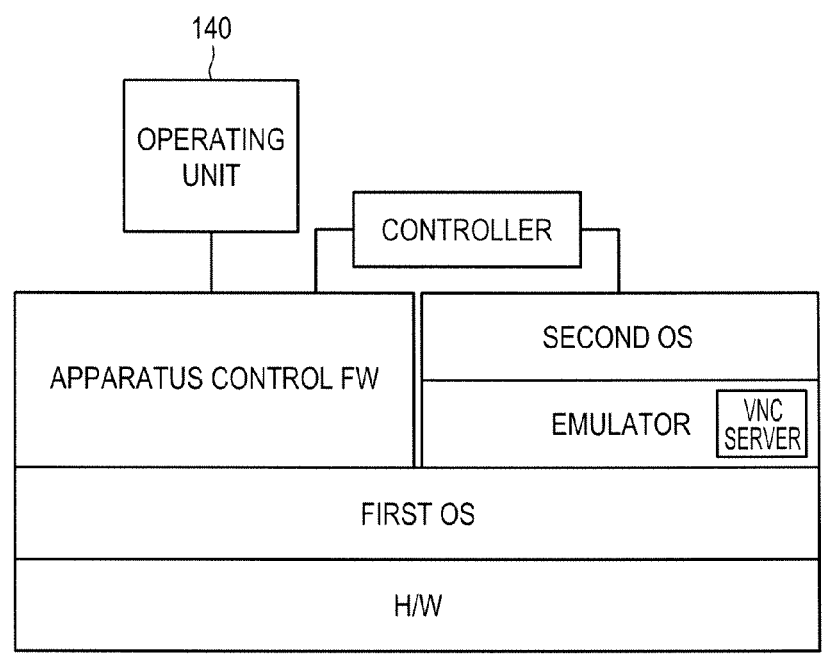
FIG. 1 is a diagram illustrating an outline of a software configuration and hardware resources of an image forming apparatus according to an embodiment of the invention.

FIG. 1 is a diagram illustrating an outline of software configuration and hardware resources of an image forming apparatus according to the present embodiment.

In this drawing, an apparatus control firmware (hereinafter referred to as an apparatus control FW) corresponding to a control program of the invention and an emulator operate on a first operating system (hereinafter referred to as a first OS). The first OS is a general-purpose OS that operates the apparatus control FW and the emulator and is configured as Linux, Windows (trademark; the same hereinbelow), or the like. The apparatus control FW is software that operates the image forming apparatus. A second operating system (hereinafter referred to as a second OS) operates on the emulator as second to N-th (N is an is an integer of 2 or more) operating systems that operate on the first OS. The emulator is software that emulates hardware to provide the hardware to the second OS. The second OS is an OS that operates an image data editing application or the like and is configured as Linux, Windows, MacOS (trademark; the same hereinbelow), or the like.

A VNC server that corresponds to an operation screen server is provided on the emulator. The VNC server is software that allows the screen of the second OS to be operated at a remote site.

Further, the image forming apparatus includes a controller that can be executed from the apparatus control FW and the second OS. The controller is a component on which an interpreter that executes a PostScript (trademark; the same hereinbelow) operates or the like. The controller may be configured as any one of software and hardware and may be configured as a combination of both.

The apparatus control FW controls an operating unit 140 and the like included in the image forming apparatus. The operating unit 140 displays various pieces of information and accepts an input operation. The operating unit 140 displays a screen transmitted from the apparatus control FW and a screen transmitted from the second OS and accepts operations on these screens.

Figure 2:
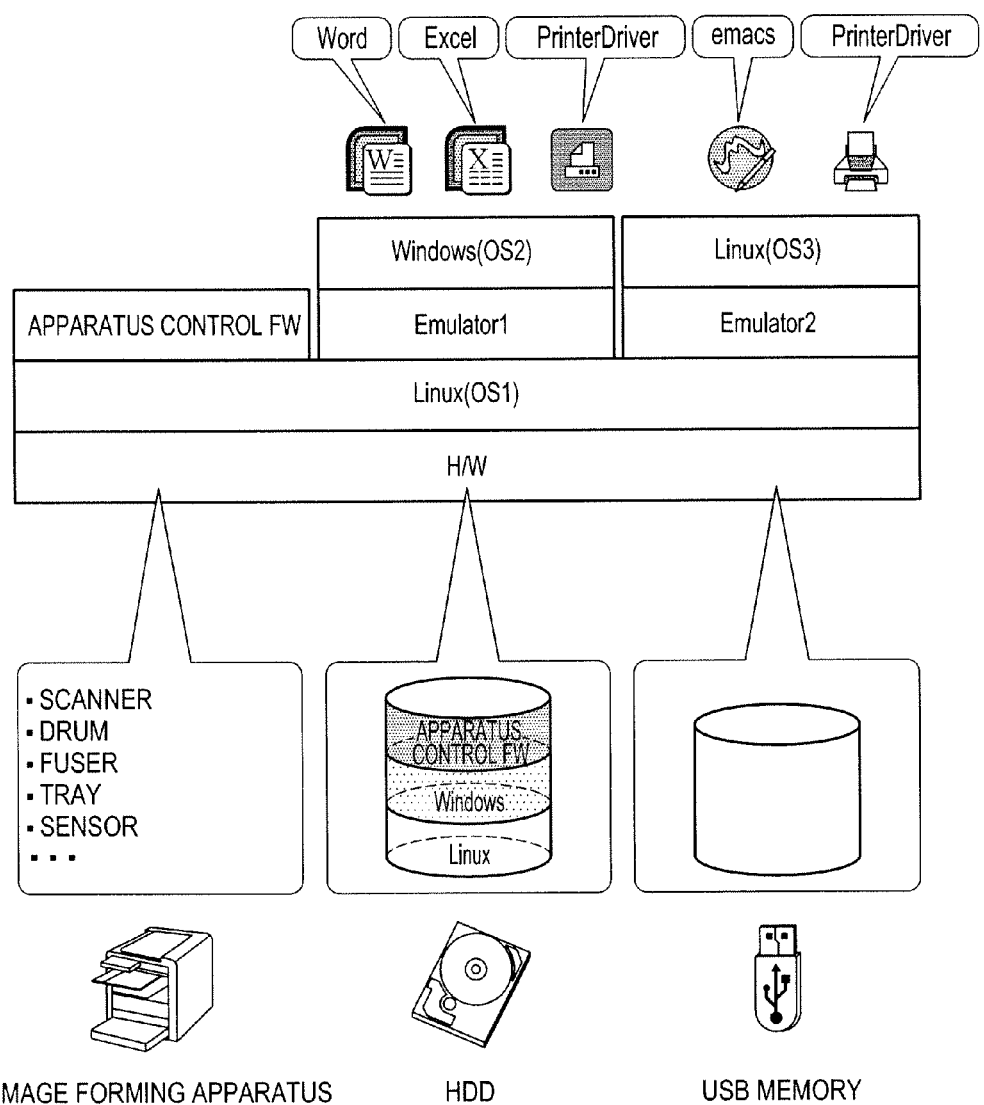
FIG. 2 is a diagram illustrating an outline of the software configuration including application software and the hardware resources.

Next, the software configuration and the hardware resources will be described in further detail based on FIG. 2. In the embodiment illustrated in FIG. 2, Linux (trademark; the same hereinbelow) operates as the first operating system (hereinafter referred to as a first OS), and the apparatus control FW and emulators Emulator1 and Emulator2 operate on the first OS. Windows corresponding to the second operating system (hereinafter referred to as a second OS) of the invention operate on the Emulator1 and Linux corresponding to a third operating system (hereinafter referred to as a third OS) of the invention operate on the Emulator2 respectively. For example, Qemu (trademark; the same hereinbelow) or the like can be used as the emulator, but the emulator is not particularly limited in the invention.

In the present embodiment, although the second and third operating systems are illustrated as the second to N-th operating systems that operate on the first operating system, the number of operating systems as the second to N-th operating systems is not particularly limited in the invention. Only the second operating system may operate and fourth and subsequent operating system may operate.

Word (trademark; the same hereinbelow), Excel (trademark; the same hereinbelow), and a printer driver (PrinterDriver) prepared for Windows operate on the second OS as applications of the invention.

emacs (trademark; the same hereinbelow) which is an editor used for Linux and a printer driver (PrinterDriver) prepared for Linux operate on the third OS as applications of the invention.

The printer drivers may be those that are generally prepared as those mounted on a PC. In the present embodiment, although it is not necessary to use a printer driver that is prepared exclusively for the image forming apparatus, a printer driver prepared for exclusive use may also be used. Although not illustrated in FIG. 2, the image forming apparatus also includes the aforementioned controller.

The first, second, and third OSs are provided in the image forming apparatus and can control hardware resources (hereinafter referred to H/W) of the invention. The H/W includes a scanner, a drum, a fuser, a feed tray, various sensors, a HDD, and an externally attached medium (for example, a USB memory) which have important function in the image forming apparatus as well as the operating unit 140. These H/W resources can be directly accessed by the first OS. On the other hand, the second OS and the third OS are OSs that are operated by a general PC and do not directly access hardware that is unique to the image forming apparatus. However, the second OS and the third OS can directly access H/W such as a HDD and a USB memory that is also used in general PCs.

The HDD can store the apparatus control FW, the first OS, the second OS, the third OS, applications, printer drivers, data, rasterized data for image formation, data handled by applications, and the like. In this case, the HDD can control areas that are read and written by applications by partitioning the areas for the apparatus control FW, the second OS application, and the third OS application, for example.

When output data (for example, Word document data) is present in an external PC on a network, the data itself may be copied to a shared folder of Windows (the second OS) in the image forming apparatus. The storage destination can be designated by setting individual IP addresses to the apparatus control FW, the second OS, and the third OS using bridge connection. When original data is saved in the HDD area managed by the second OS and needs to be changed before the data is output, the data can be edited just by activating an application (Word) on the second OS. When the data is to be saved, the data may be saved in the HDD area managed by the second OS as in the general PC. Moreover, the data can be edited while displaying the content by switching the screens of the apparatus control FW, the second OS, and the third OS on the operating unit 140.

In the present embodiment, since the second and third OSs are OSs used in the general PC, the data processed by the applications used in these OSs can naturally be used on the second and third OSs. Excel, emacs (an editor used in Linux), or the like as well as the Word can be activated, and when data is saved in the apparatus from the external PC, the data can be edited on the apparatus. In this manner, original data can be edited on the image forming apparatus, and the user-friendliness is improved.

Figure 3:
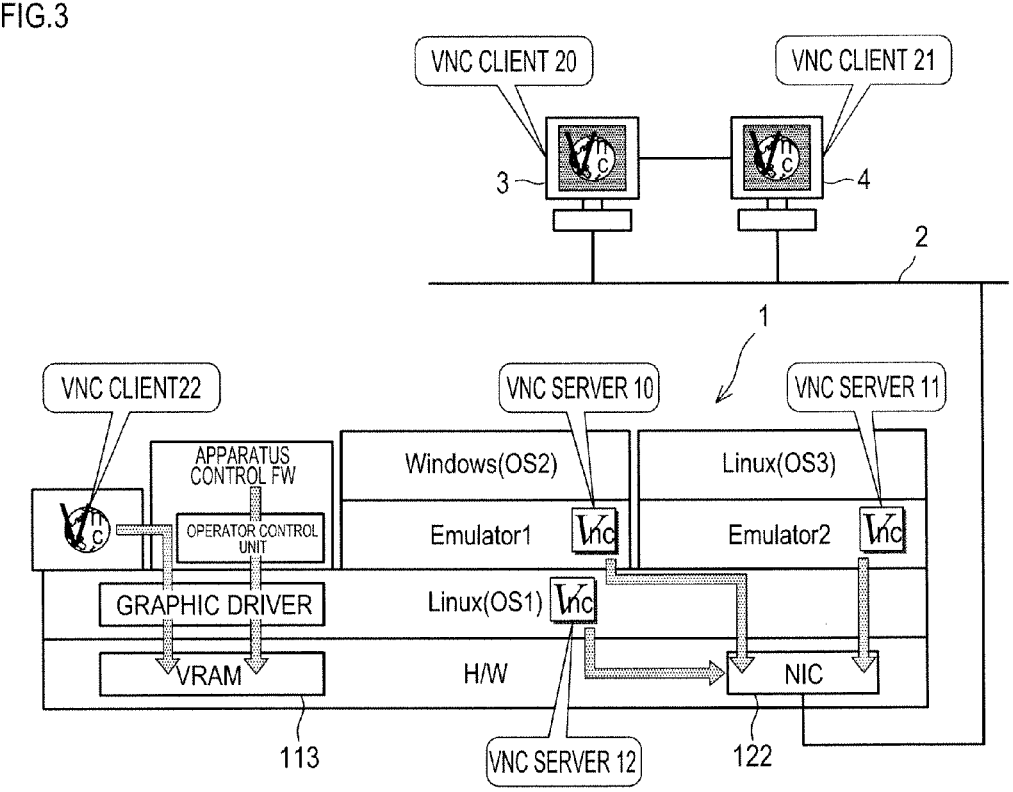
FIG. 3 is a diagram illustrating a software configuration and a network configuration illustrating an operation screen server.

As illustrated in FIG. 3, VNC servers (trademark; the same hereinbelow) 10, 11, and 12 corresponding to respective OSs are provided to the first OS, the Emulator1 and the Emulator2. The VNC servers 10 and 11 provides screen data of the second and third OSs to VNC clients 20 to 22, and the VNC server 12 provides screen data of a VRAM 113 to VNC clients 20 and 21 of PCs 3 and 4. The VNC clients have a function of acquiring screen data from VNC servers, transferring the screen data to operator control units of their own apparatuses (the image forming apparatus 1 and the PCs 3 and 4) to display the screens, and accepting operations on the screens to deliver the operations to the VNC servers. Moreover, the VNC servers accept operation information from the connected VNC clients and deliver the operation information to their corresponding OSs. In this manner, operations on the respective OSs can be performed from the operating unit of the image forming apparatus 1 and the PCs. The VNC server corresponds to an operation screen server, and the VNC client corresponds to an operation screen client. Moreover, the VNC server 12 of the first OS may be configured as hardware.

The VNC client 22 operated by the first OS of the image forming apparatus 1 can connect to the VNC servers 10 and 11 of the respective OSs, and the VNC clients 20 and 21 included in the PCs 3 and 4 outside the image forming apparatus 1 can connect to the VNC servers 10, 11, and 12 of the respective OSs via a network interface card (NIC) 122. The VNC servers 10 and 11 correspond to a first operation screen server, and the VNC server 12 corresponds to a second operation screen server.

An operator control unit 142 (FIG. 4) selects or combines a screen image generated by the apparatus control FW and a screen image acquired from the VNC server 10 or 11 by the VNC client 22 and renders the screen images into the VRAM 113 using a graphic driver. A screen is displayed on the operating unit 140 based on the rendering data of the VRAM 113. Moreover, as for the operations performed on the screen, an operation on the screen generated by the apparatus control FW is accepted by the apparatus control FW, and an operation on the screen acquired from the VNC server 10 or 11 is input to the connected VNC server 10 or 11 through the VNC client 22. The control unit of the image forming apparatus 1 controls the operation of the image forming apparatus 1 according to the content of the operation accepted by the apparatus control FW. The operation input to the VNC server 10 or 11 is input to the corresponding OS (the second or third OS), and the OS operates according to the operation content. When the VNC server is accessed by any one of the VNC clients, access from the other VNC clients is restricted. A notification that access to the VNC server is restricted may be sent to the other VNC clients.

Figure 4:
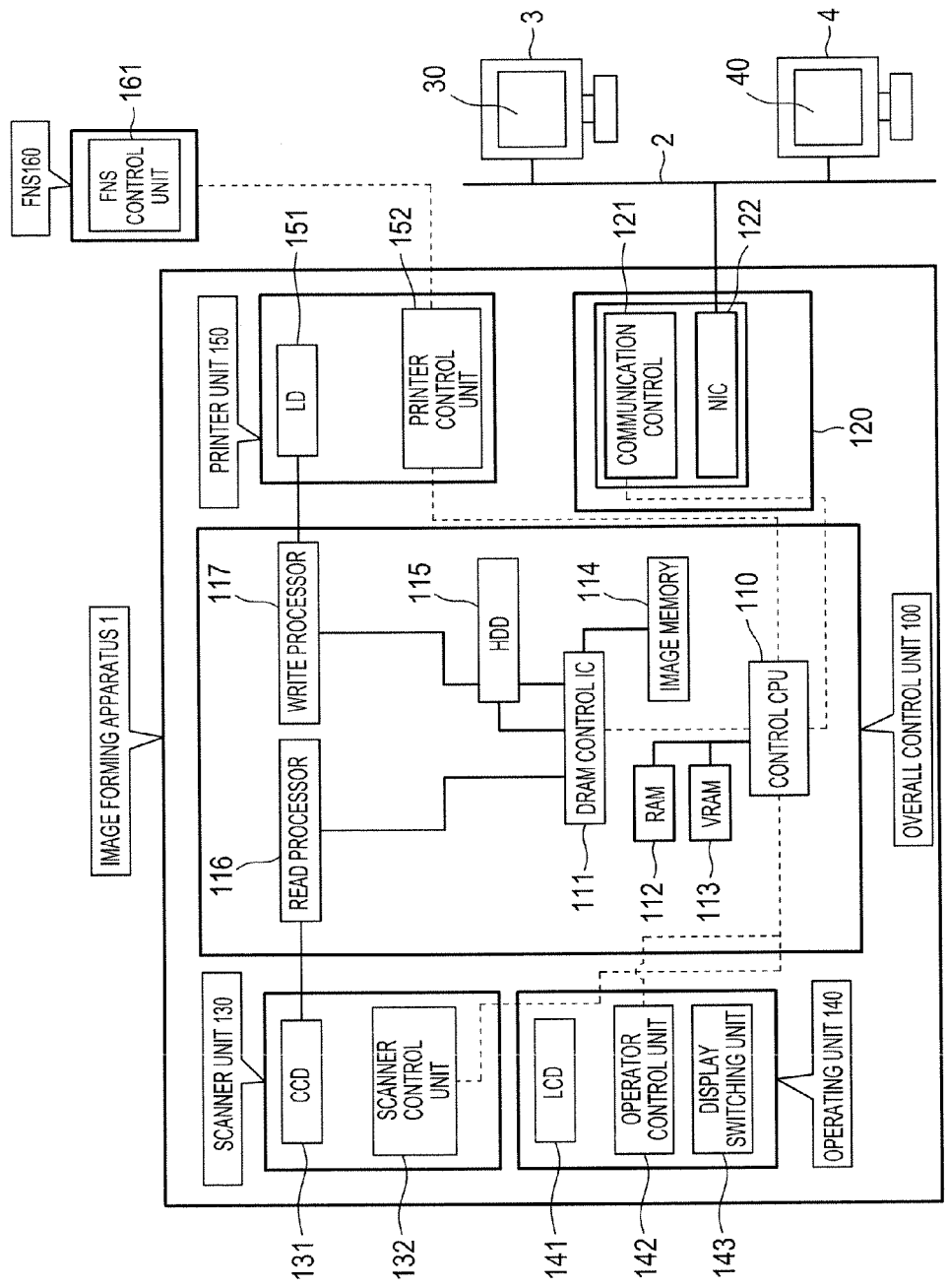
FIG. 4 is a control block diagram.

FIG. 4 is a diagram illustrating a control block of the image forming apparatus 1 according to the present embodiment.

The image forming apparatus 1 includes, as a main component, an overall control unit 100, a scanner unit 130, an operating unit 140, and a printer unit 150. Moreover, in the present embodiment, an FNS 160 which is a post-processing apparatus is connected to an image forming apparatus main body as part of the image forming apparatus 1. In the invention, the presence of the post-processing apparatus is not particularly limited.

The image forming apparatus 1 is connected to the PCs 3 and 4 which are external apparatuses via a LAN 2 which is a network. The type and the number of apparatuses connected to the image forming apparatus 1 are not particularly limited. The image forming apparatus 1, the LAN 2, and the PCs 3 and 4 form part or an entire part of an image forming system. The PCs 3 and 4 have operating units 30 and 40 that display a screen and accept an operation, and a screen can be displayed and operated on the operating units 30 and 40 via the VNC clients 20 and 21.

The overall control unit 100 includes a control CPU 110 that corresponds to a processor, and a DRAM control IC 111 is connected to the control CPU 110.

A RAM 112 and a VRAM 113 are connected to the control CPU 110.

The control CPU 110 controls the entire image forming apparatus 1 by executing software such as the apparatus control FW to understand the entire state of the image forming apparatus 1.

The scanner unit 130 includes a CCD 131 that optically reads an image to obtain image information and a scanner control unit 132 that controls the entire scanner unit 130. The scanner control unit 132 is connected to the control CPU 110 and is controlled by the control CPU 110. The scanner control unit 132 can be configured as a CPU, a program that operates the CPU, and or the like. The image information read by the CCD 131 is processed by a read processor 116. The read processor 116 is connected to the DRAM control IC 111, and image data processed by the read processor 116 is transmitted to the DRAM control IC 111.

The RAM 112 is used for executing programs such as the apparatus control FW, the first, second, and third OSs, an application program, and a printer driver loaded therein, and is used as a work area accompanied by the execution. Further, areas for storing screen data of the second and third OSs are allocated to the RAM 112, and the screen data of the second and third OSs in the areas is provided to the VNC clients by the VNC servers 10 and 11.

The operating unit 140 includes a touch panel LCD 141 and the operator control unit 142, and the LCD 141 and the operator control unit 142 are connected, and the operator control unit 142 and the control CPU 110 are connected so that serial communication can be performed. With this configuration, the control of the operating unit 140 is performed by the control CPU 110, the screen image rendered into the VRAM 113 is displayed on the LCD 141, and the input information of the operating unit 140 is transmitted to the control CPU 110. The operator control unit 142 can be configured as a CPU, a program that operates the CPU, or the like. The operating unit 140 includes a display switching unit 143. The display switching unit 143 selectively renders the screen generated by the apparatus control FW and the screens of the second and third OSs acquired by the VNC client in a storage area of the VRAM 113 corresponding to a predetermined region (a region 1482 of FIG. 16) of the screen displayed on the operating unit 140, whereby these screens can be switchably displayed. Moreover an operation within the screen region 1482 of the LCD 41 is transferred to the VNC server via the VNC client. In this manner, it is possible to perform operations on the second and third OSs.

Hereinafter, how the screens of the second and third OSs are displayed on the operating unit 140 of the image forming apparatus 1 will be described.

Figure 16:
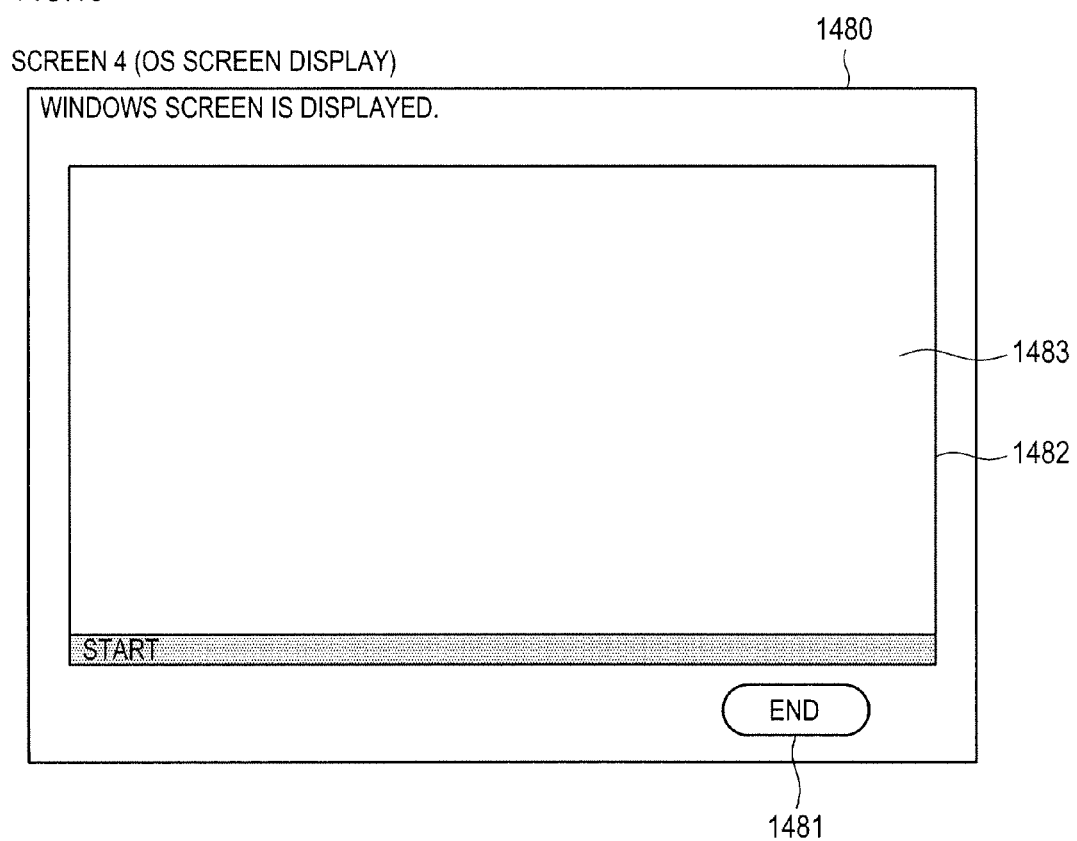
FIG. 16 is a diagram illustrating other OS screen.

When a request to switch to the screen of the second or third OS is issued (for example, by a user operation), the apparatus control FW acquires screen data of OS from the VNC server corresponding to the designated OS via the VNC client 22. The apparatus control FW generates a display screen with the aid of the operator control unit 142 and writes the display screen data to the VRAM 113 with the aid of the graphic driver. The entire display screen may be used as the OS screen, and the OS screen may be fitted in a predetermined region of the screen. In the present embodiment, as illustrated in FIG. 16, the OS screen is fitted in the predetermined region 1482 of the screen. In this manner, the OS screen is displayed on the operating unit 140.

In the screen illustrated in FIG. 16, an operation on a region outside the region 1482 is transferred to the apparatus control FW, and the apparatus control FW executes an operation according to the operation (for example, an operation on an "End" button of FIG. 16). On the other hand, an operation inside the region 1482 is transferred to the VNC server via the VNC client and is input to the corresponding OS. In this manner, the operation on the second and third OSs can be performed.

In the present embodiment, the reason why the entire screen is not used as the OS screen but is fitted into a predetermined region is because if the entire screen is used as the OS screen, all operations on the screen is transferred to the VNC server and is not accepted by the apparatus control FW.

Thus, in order to close the OS screen to return to the screen of the apparatus control FW or to switch to the other OS screen, means for accepting an operation using means such as an additional hard key other than a screen operation is required, which may increase the cost.

The DRAM control IC 111 is connected to an image memory 114. The image information acquired by the scanner unit 130, the image information, print conditions, and file information acquired through the LAN 2, and the like are stored in the image memory 114. The image memory 114 is a storage area of the image information, the print conditions, and the file information and stores information on print jobs.

Moreover, an HDD 115 is connected to the DRAM control IC 111. As described above, areas for storing the first, second, and third OSs, an application, and document file data created by the application, a printer driver, image information, print information, and the like are allocated to the HDD 115 according to the first, second, and third OSs. The areas of the HDD 115 may be partitioned to be used for the first, second, and third OSs. The RAM 112, the VRAM 113, the image memory 114, and the HDD 115 form a storage unit.

Further, a write processor 117 is connected to the DRAM control IC 111. The write processor 117 is connected to an LD 151 of the printer unit 150 and processes data used for operations of the LD 151. Moreover, the printer unit 150 includes a printer control unit 152 that controls the entire printer unit 150, and the printer control unit 152 is connected to and controlled by the control CPU 110. Moreover, an FNS control unit 161 that controls the entire FNS 160 is connected to the printer control unit 152. In this manner, the FNS 160 can be controlled by the control CPU 110 with the aid of the printer control unit 152.

Further, a communication control unit 121 that controls an entire communication unit 120 that communicates with the external apparatus is connected to the control CPU 110, and the control CPU 110 can connect to the LAN 2 via the NIC 122 included in the communication unit 120. The communication control unit 121 operates according to an operation command of the control CPU 110, transmits data transferred from the control CPU 110 according to a predetermined communication protocol to the LAN 2 through the NIC 122, receives data transmitted from the LAN 2, and transmits the received data to the control CPU 110. Thus, operation screen information of the VNC servers 10, 11, and 12 is transmitted to the VNC clients 20 and 21 of the PCs 3 and 4 through the NIC 122 and the LAN 2, and input operation information on the operations performed on the operation screens by the PCs 3 and 4 is transmitted to the control CPU 110 through the LAN 2 and the NIC 122.

The control CPU 110 is a component on which software such as the first, second, and third OSs and the apparatus control FW operates, and the control CPU 110 forms a control unit of the invention together with the scanner control unit 132, the operator control unit 142, the display switching unit 143, the printer control unit 152, and the communication control unit 121.

Next, a basic operation of the image forming apparatus 1 will be described.

First, a procedure of storing image information in the image forming apparatus 1 will be described.

First, in the image forming apparatus 1, when the scanner unit 130 reads a document image to generate image information, the scanner unit 130 optically reads the document image from a document with the aid of the CCD 131. In this case, the operation of the CCD 131 is controlled by the scanner control unit 132 that receives a command from the control CPU 110.

The image read by the CCD 131 is processed by the read processor 116, and the processed image information is stored in the image memory 114 or the HDD 115 via the DRAM control IC 111. The image information and the print information stored in the image memory 114 or the HDD 115 can be managed by the control CPU 110 as a job.

When image information is acquired externally, job information transmitted from the PCs 3 and 4 or the like through the LAN 2, for example, is stored in the image memory 114 or the HDD 115 by the DRAM control IC 111 via the NIC 122 and the control CPU 110.

Moreover, when image information is generated by an application in the image forming apparatus 1, image information obtained through the printer driver, the emulator, and the apparatus control FW is stored in the image memory 114 or the HDD 115 in a manner similarly to the above. In this case, print data transmitted from the printer driver is accepted as a job of the image forming apparatus, and the job can be stored or executed.

When the image information acquired externally or acquired by an application that operates in the image forming apparatus 1 is vector data, the data is rasterized (subjected to RIP process; Raster Image Processing) by a controller at an appropriate time.

When an image is output by the image forming apparatus 1, that is, when the image forming apparatus 1 is used as a copier or a printer, job information including the image information stored in the image memory 114 or the HDD 115 is transmitted to the write processor 117 via the DRAM control IC 111 as data, and write data is transmitted from the write processor 117 to the printer unit 150.

In the printer unit 150, after the surface of a photoconductor is uniformly charged by a charging unit (not illustrated), exposure scanning is performed based on the write data using a laser beam of the LD 151 to form a latent image, and the latent image is subjected to reversal development by a developing unit to form a toner image on the surface of the photoconductor. A sheet feed from a feed tray is conveyed to a transfer position by a conveying device, and the toner image is transferred to the sheet by a transfer unit at the transfer position. After that, the sheet having an image formed thereon is heat-fused by a fuser and is conveyed to the FNS 160. The FNS 160 to which the sheet having an image formed thereon is conveyed includes a punching unit that forms holes in a sheet, a stapler that puts staples into a sheet, and the like and performs post-processing on the sheet as necessary.

When the data of the external PCs 3 and 4 is output, the data can be output by transmitting the data to the apparatus control FW using a printer driver mounted in the PC.

When the data present in the second and third OSs is output, since the second and third OSs are OSs that are used in general PCs, the data can be output to an apparatus control FW of a main apparatus by designating an output destination printer as the main apparatus using the same printer driver as mounted on the external PC. That is, the data can be output without the need to create a dedicated printer driver. In this case, the output data is accepted by the apparatus control FW as a job, and the output process can be performed.

In this manner, it is possible to perform the processes up to the outputting on the image forming apparatus 1 without requiring a dedicated printer driver. However, in the present embodiment, a dedicated printer driver may be prepared, and the type of the printer driver is not limited to a general-purpose and a dedicated-purpose.

In addition, the H/W unique to the image forming apparatus may not be controlled by the second and third OSs used in general PCs (for example, management of heat-fusing temperature). However, since the second and third OSs are operating on the first OS that activates the apparatus control FW that controls the apparatus, the H/W can be controlled via the apparatus control FW. If commands are defined by the applications that are activated on the second and third OSs and the apparatus control FW, when the application transmits a command to "set fusing temperature to xx degrees" to the apparatus control FW, and the apparatus control FW having received the command analyzes the command to control the H/W, the main apparatus can be controlled on the second and third OSs via the apparatus control FW. In this manner, the main apparatus can be controlled from the second and third OSs. That is, when the apparatus control FW has a command receiving function and the second to N-th OSs have a command transmitting function, commands can be issued between other OSs and can be executed.

When an image is output, the control CPU 110 outputs the image based on job information. The job information includes output condition information as well as the image information. The output conditions include a print mode, sheet information, a feed tray, a discharge destination, post-processing conditions. Specific examples thereof include a pixel count of an output image, selection of color and monochrome, selection of single-side or double-side, tone adjustment, a sheet size, a sheet orientation, a sheet type (paper type, weight, sheet color, and the like), a selection of feed tray, presence of post-processing, post-processing conditions. The output conditions correspond to print conditions.

Typical settings are determined in advance as the initial settings of the output conditions. Moreover, the output conditions can be set on the operating unit 140. When image information is acquired, the operator control unit 142 is controlled by the control CPU 110, and a screen on which output settings can be input is displayed on the LCD 141.

When an operator performs an appropriate input operation, information such as output conditions (print mode, feed tray, discharge destination, post-processing conditions, and the like) set on the operating unit 140 are sent from the operator control unit 142 to the control CPU 110. The control CPU 110 having received the information creates output condition information and temporarily stores the information in a memory included in the control CPU 110. When image information is acquired, the output condition information is stored with the image information in the image memory 114 or the HDD 115 as job information.

Further, when data is output via the printer drivers of the second and third OSs, the data can be handled as a job of which the output conditions are set via the printer driver, and as for this job, the output conditions thereof can be further set on the apparatus control FW.

Figure 5:
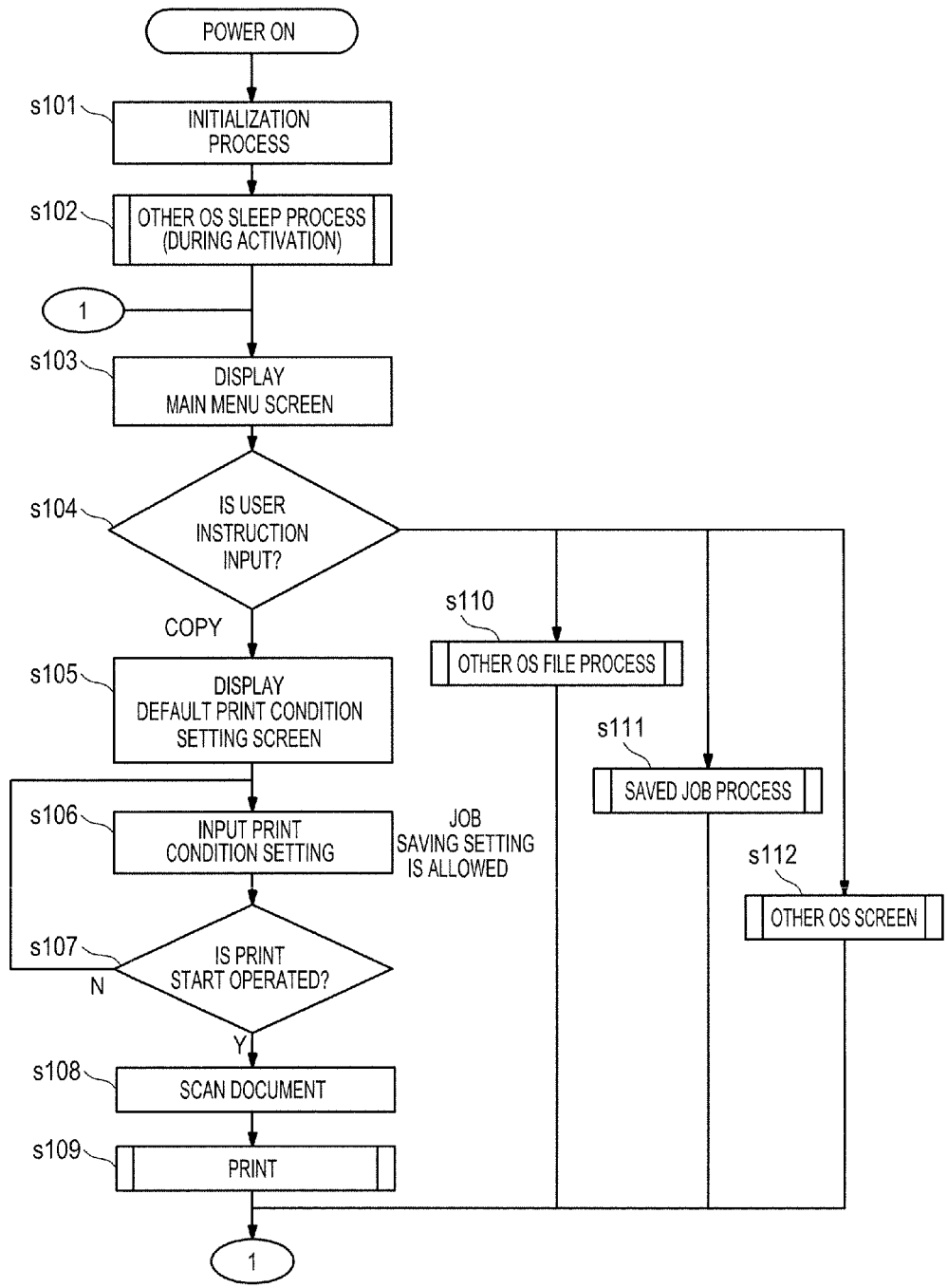

Next, the procedure of the overall control in the control CPU 110 of the present embodiment will be described based on the flowchart of FIG. 5. The following procedure is executed as part of the overall control of the apparatus control FW that operates on the first OS.

The first OS, the apparatus control FW, the Emulator1, and the Emulator2 are activated based on power-ON of the image forming apparatus 1, and an initialization process is performed (step s101). Subsequently, the other OS (in the present embodiment, the second and third OSs) is activated, and sleep control during activation is performed (step s102). Hereinafter, the second and third OSs will be expressed as they are or the other OS.

In the sleep control during activation, a memory state in an active state of an OS that is put into a sleep mode is saved in the HDD 115, and the memory is released (hereinafter, this state will be referred to as a sleep state). When the sleeping OS is woke up, the memory state saved in the HDD 115 is copied to the memory and thus the OS enters into an available state (this waking-up operation is also referred to as "activation" in the following description).

Subsequently, a main menu screen on which an operation can be input is displayed on the operating unit 140 (step s103; Procedure 1). In this case, when there is a request to the VNC server 12 from the VNC clients 20 and 21 of the PCs 3 and 4, operation screen information is sent to the VNC clients 20 and 21, and a main menu screen is similarly displayed on the operating units 30 and 40 of the PCs 3 and 4. In this case, the operation screen corresponds to a first operation screen.

Figure 6:
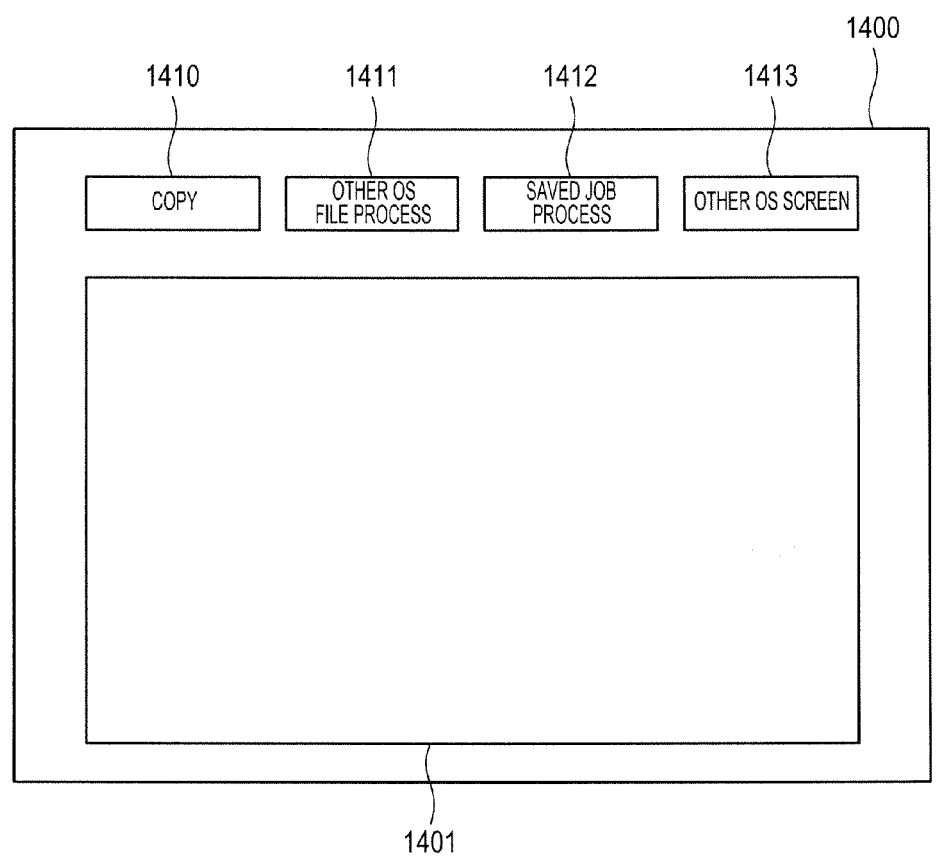
FIG. 6 is a diagram illustrating a main menu screen.

As illustrated in FIG. 6, a copy button 1410, an other OS file process button 1411, a saved job process button 1412, and an other OS screen button 1413 are displayed on a main menu screen 1400 so that the buttons can be pressed to select one of a copy process, an other OS file process, a saved job process, and an other OS screen display process.

When a user presses and selects any one of the buttons on the main menu 1400, the selected process is executed (step s104).

When the copy button 1410 is pressed, a print condition setting screen containing default print conditions is displayed so that an operation can be input (step s105). The default print conditions are stored in a storage unit such as the HDD 115 or a flash memory (not illustrated), and the conditions can be read. Moreover, when the other OS file process button 1411 is pressed, an other OS file process procedure (step s110) is executed. When the saved job process button 1412 is pressed, a saved job process (step s111) is executed. When the other OS screen button 1413 is pressed, an other OS screen process (step s112) is executed. After the respective processes are executed, the flow returns to Procedure 1.

After the default print condition setting screen is displayed (step s105), the input settings of the print conditions are accepted (step s106). In the print condition setting, job saving setting is allowed. In the job saving, print conditions and image data are saved in correlation if there is no other OS information, and the print condition, the image data, and file information are saved in correlation if there is other OS information. Due to the job saving, the job can be repeatedly printed.

Subsequently, standby is performed until a print start operation is received (step s1107). When a user inputs a print start operation (Y in step s107), the scanner unit 130 scans a document to generate image data (step s108), and a print process is executed (step s109). After the print process is performed, the flow returns to Procedure 1.

Figure 7:
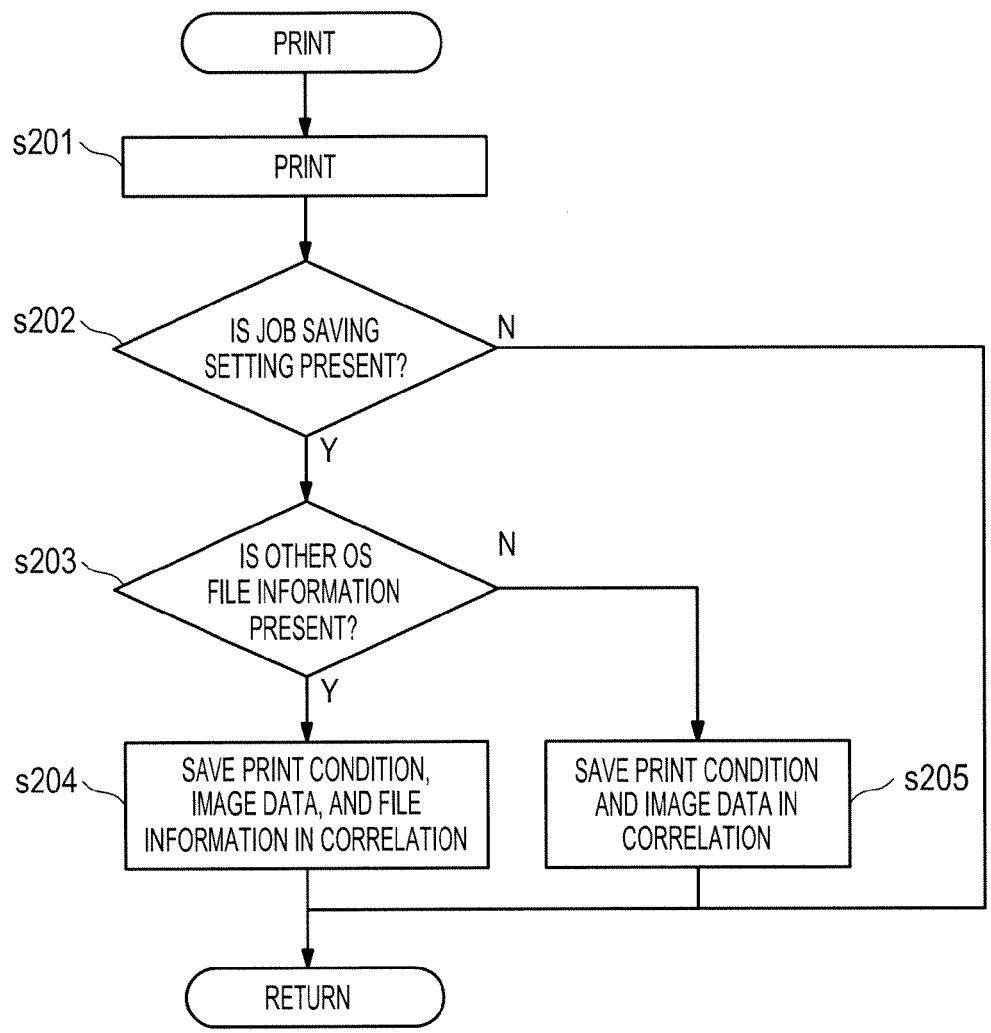
FIG. 7 is a flowchart illustrating the procedure of a print process.

Subsequently, the procedure of the print process which is part of the overall control of the apparatus control FW will be described based on the flowchart of FIG. 7.

First, a print process is performed (step s201), and after that, it is determined whether job saving setting is present in the print condition setting (step s202). If there is no job saving setting (N in step s202), the flow returns from the process. When there is job saving setting (Y in step s202), it is determined whether other OS file information is present in the job (step s203). If the other OS file information is present (Y in step s203), print conditions, image data, file information (a file name, a time stamp, a file size, or the like of a document file) are saved in the image memory 114, the HDD 115, or the like in correlation (step s204), and the flow returns from the process.

If the other OS file information is not present (N in step s203), print conditions and image data are saved in the image memory 114, the HDD 115, or the like in correlation (step s205), and the flow returns from the process.

Figure 8:
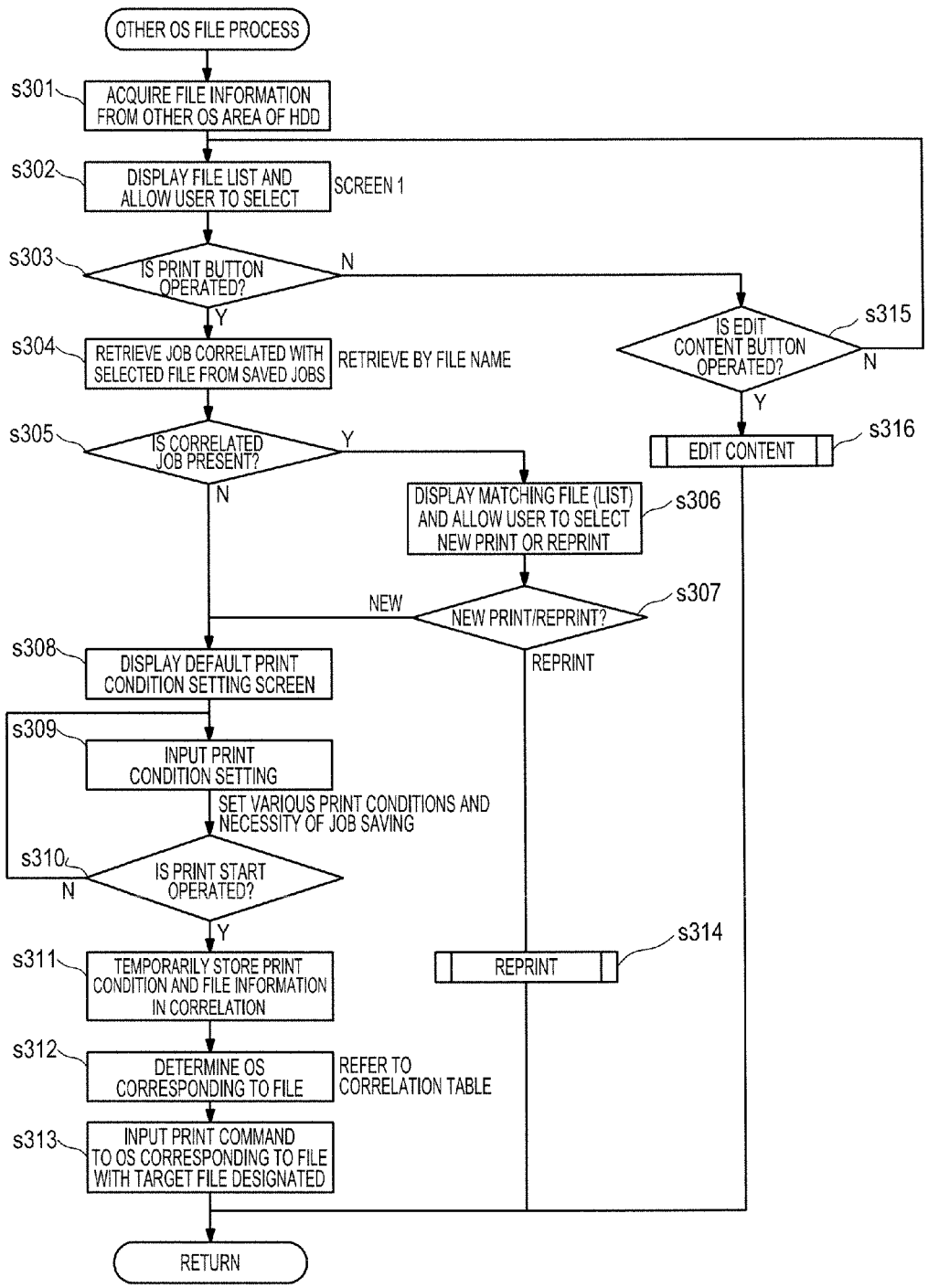
FIG. 8 is a flowchart illustrating the procedure of other OS file process.

Next, the procedure of the other OS file process which is part of the overall control of the apparatus control FW will be described based on the flowchart of FIG. 8.

First, file information is acquired from an other OS area allocated to the HDD 115 (step s301). In this example, although a list of other OS files only is displayed, data managed by the apparatus control FW and data managed by the other OS may be acquired together and may be displayed as a list.

A selection of a file by the user from a file list displayed based on the file information is accepted (step s302).

Figure 9:
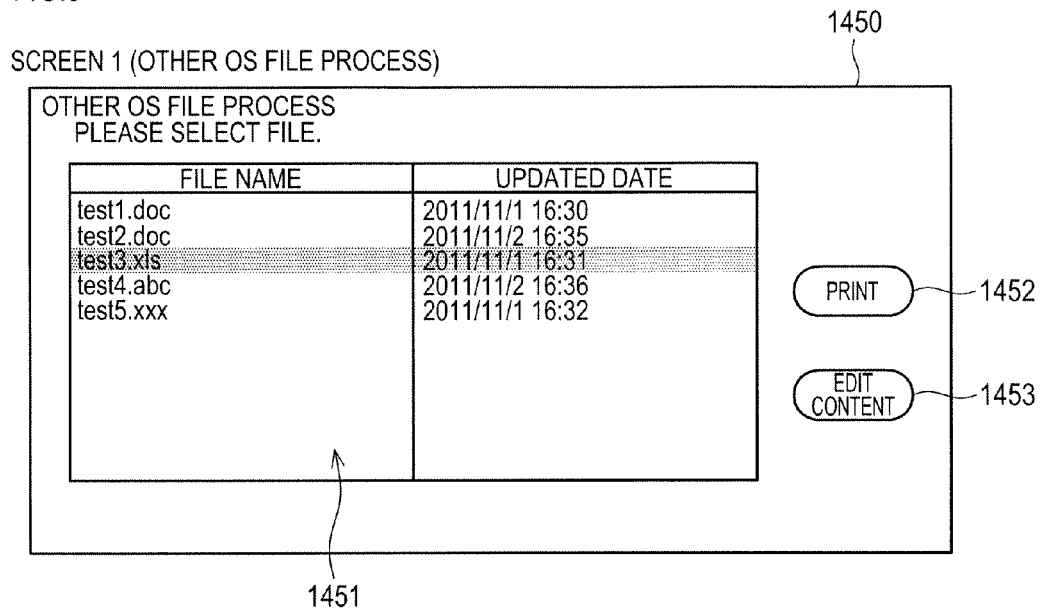
FIG. 9 is a diagram illustrating a file list display screen.

The file list display screen 1450 is illustrated in FIG. 9. The file list display screen 1450 is displayed on the operating unit 140. Moreover, when there is access to the VNC server 12 from the VNC clients 20 and 21 of the PCs 3 and 4, the operation screen information is sent from the VNC server 12 to the VNC clients 20 and 21 and is displayed on the operating units 30 and 40 of the PCs 3 and 4 so that operations can be input on the operation screen. The operation screen corresponds to a first operation screen.

As illustrated in FIG. 9, on the file list display screen 1450, a file name with an extension and an updated date are displayed as a list in a list field 1451, and the user can press and select a row on which a desired file in the list is displayed. Moreover, on the file list display screen 1450, a print button 1452 and an edit content button 1453 are displayed to the right side of the list field 1451 so that the buttons can be pressed. On the file list display screen 1450, a target OS of a file can be understood from the extension thereof.

When the selection of the user is accepted, it is determined whether the print button 1452 is pressed (step s303). When the print button 1452 is pressed in a state where any one file is selected (Y in step s303), a job correlated with the selected file is retrieved from the saved jobs using a file name (step s304), and it is determined whether the correlated job is present (step s305). If a saved job that is output based on a previously selected file is generated, the correlated saved job is present. Even when the job is output based on the selected file, if setting of the saved job is not made, the correlated job is not saved.

When it is determined that the correlated job is present (Y in step s305), a list of files that match the job correlated with the selected file is displayed, and a selection of the user whether new printing or reprinting will be performed is accepted (step s306). This screen is displayed on the operating unit 140. Moreover, when there is access to the VNC server 12 from the VNC clients 20 and 21 of the PCs 3 and 4, the VNC server 12 sends operation screen information to the VNC clients 20 and 21, and the list is displayed on the operating units 30 and 40 of the PCs 3 and 4 so that operations can be performed on the screen. This operation screen corresponds to the first operation screen.

According to the accepted user's selection, it is determined whether new printing or reprinting is selected (step s307).

If new printing is selected (step s307: New), a default print condition setting screen is displayed on the operating unit 140 (step s308). In this case, when there is access to the VNC server 12 from the VNC clients 20 and 21 of the PCs 3 and 4, the VNC server 12 sends operation screen information to the VNC clients 20 and 21, and the default print condition setting screen is displayed on the operating units 30 and 40 of the PCs 3 and 4 so that operations can be performed on the screen. This operation screen corresponds to the first operation screen.

On the other hand, when it is determined that reprinting is selected (step s307: Reprint), the reprint process is performed (step s314) and then the flow returns from the process.

When it is determined that there is no correlated job (N in step s305), the default print condition setting screen is displayed in a manner similarly to the above (step s308).

After the default print condition setting screen is displayed (step 308), the input setting of print conditions is accepted (step s309). In print condition setting, various print settings and the necessity to save jobs can be set. After the input setting of print conditions is accepted (step s309), standby is performed until a print start operation is received (step s310). When there is a print start operation (Y in step s310), the print conditions and the file information are temporarily stored in the image memory 114, the HDD 115, or the like in correlation (step s311). Subsequently, an OS corresponding to a file is determined by referring to a correlation table based on an extension or the like of the file (step s312), a target file is designated, then a print command is input to the OS corresponding to the file (step s313), and the flow returns from the process.

The OS determination can be performed by referring to a correlation table illustrated in Table 1, in which files and OSs are correlated. The correlation table is stored in advance in the HDD 115, a flash memory (not illustrated), or the like under the control of the apparatus control FW. When files are printed or edited, the apparatus control FW refers to the correlation table to determine an OS and applications to be used and issue an instruction (command) to the OS. The correlation table may be prepared in advance, and the user may set a new correlation table and change the settings.

TABLE 1

| Extension | OS | Application |
| --- | --- | --- |
| .doc | windows | word |
| .xls | windows | excel |
| .tex | linux | emacs |
| .bmp | mac OS | photoshop |

In the second and third OSs, a command accepting Telnet is set in advance so as to be automatically activated during activation of the OSs, and the OSs have a command receiving function. Upon receiving a print command through the Telnet, the second and third OSs execute printing of the file. Applications are also automatically activated. The printer driver of this apparatus is set as the printer drivers of the second and third OSs, and the printer driver is activated so that printing is executed. The printer driver is the same as that used in general PCs.

When it is determined in the step of determining the print button operation (step s303) that the print button 1452 is not pressed (N in step s303), it is determined whether the edit content button 1453 is pressed (step s315). When neither the print button 1452 nor the edit content button 1453 is operated (N in step s315), the flow returns to step s302, and the user's selection is accepted. When the edit content button 1453 is operated (Y in step s315), the content edit process is performed (step s316), and the flow returns from the process.

Figure 10:
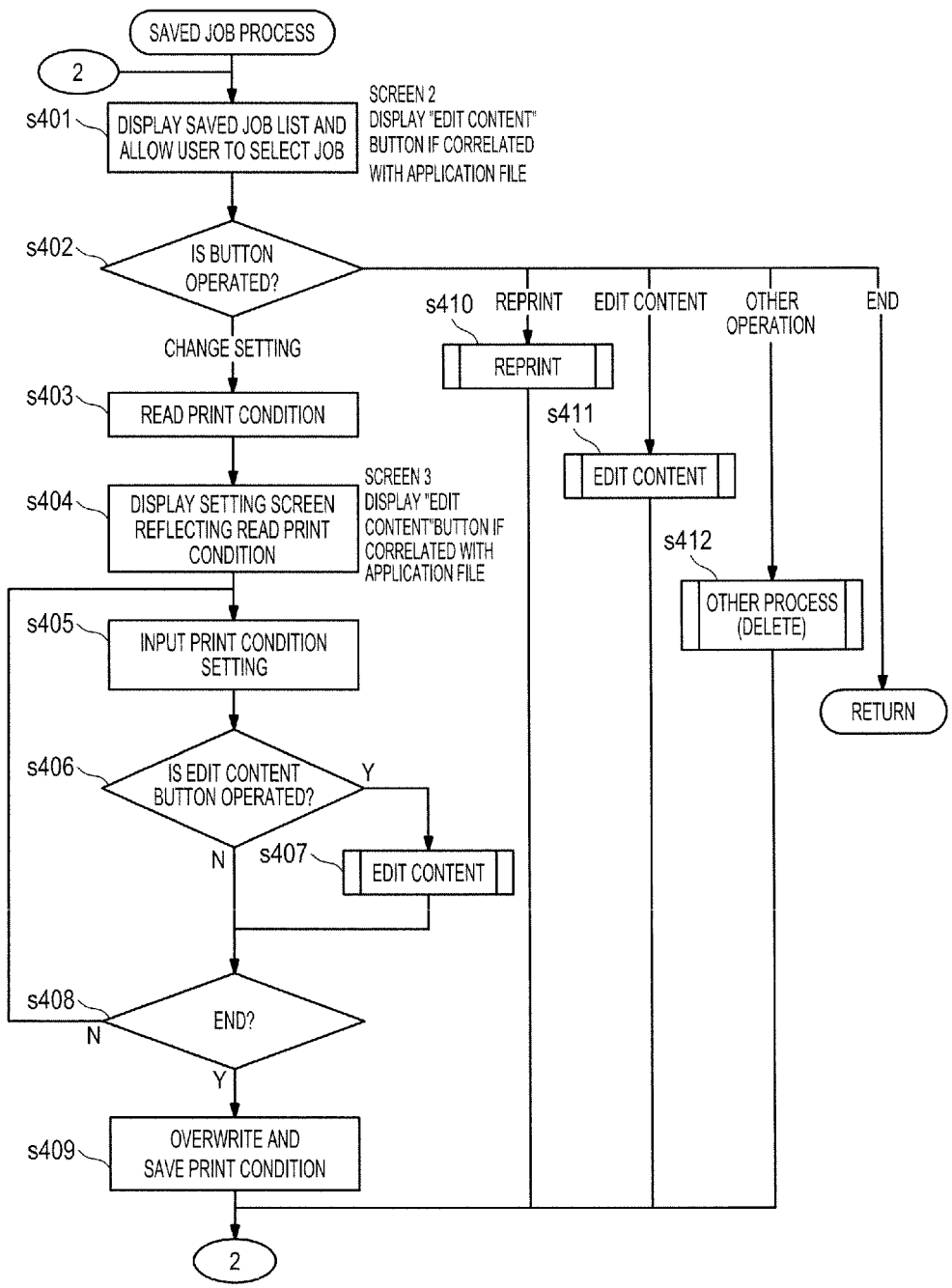
FIG. 10 is a flowchart illustrating the procedure of a saving jog process.

Next, the procedure of the saved job process will be described based on the flowchart of FIG. 10.

First, a saved job list is displayed on the operating unit 140, and the user's selection is accepted (step s401: Procedure 2). In this case, when there is a request to the VNC server 12 from the VNC clients 20 and 21 of the PCs 3 and 4, operation screen information is sent to the operating units 30 and 40 of the PCs 3 and 4 via the LAN 2, and the saved job list is displayed on the operating units 30 and 40 of the PCs 3 and 4. In this case, the operation screen corresponds to the first operation screen.

Figure 11:
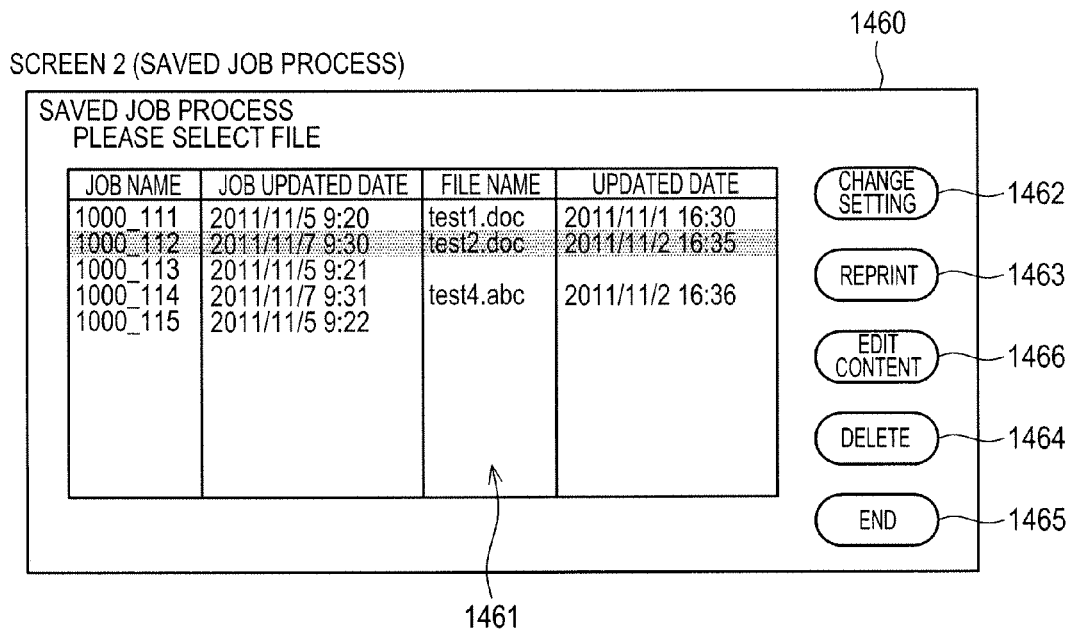
FIG. 11 is a diagram illustrating a saved job list screen.

A saved job list display screen 1460 is illustrated in FIG. 11. Saved jobs are saved in the image memory 114 or the like and are read and displayed as a list. On the saved job list display screen 1460, a job name and a job updated date are displayed as a list in a list field 1461, and if a file is correlated with the job, a file name of a document file and the updated date (time stamp) of the file are displayed as a list together with an extension. The user can press and select a row of a desired job in the list. On the saved job list display screen 1460, a setting change button 1462, a reprint button 1463, a delete button 1464, and an end button 1465 are displayed to the right side of the list field 1461 so that the buttons can be pressed. If the selected job is correlated with file information, an edit content button 1466 is also displayed so that the button can be pressed.

When it is determined whether a button is operated on the saved job list display screen 1460 (step s402) and the reprint button 1463 is operated (step s402: Reprint), the reprint process is executed (step s410), and then, the flow returns to Procedure 2. When the edit content button 1466 is operated (step s402: Content Edit), the content edit process is executed (step s411), and after that, the flow returns to Procedure 2. When the other operation is performed (step s402: The Other Operation), the other process such as delete is executed (step s412), and after that, the flow returns to Procedure 2. When the the end button 1465 is operated, the flow returns from the process.

When it is determined in the step of determining the button operation (step s402) that setting change is selected (step s402: Setting Change), print conditions are read from the selected saved job (step s403), and a setting screen in which the read print conditions are reflected is displayed on the operating unit 140 (step s404). In this case, when there is a request to the VNC server 12 from the VNC clients 20 and 21 of the PCs 3 and 4, operation screen information is sent to the VNC clients 20 and 21, and a setting screen is similarly displayed on the operating units 30 and 40 of the PCs 3 and 4. In this case, the operation screen corresponds to the first operation screen.

Figure 12:
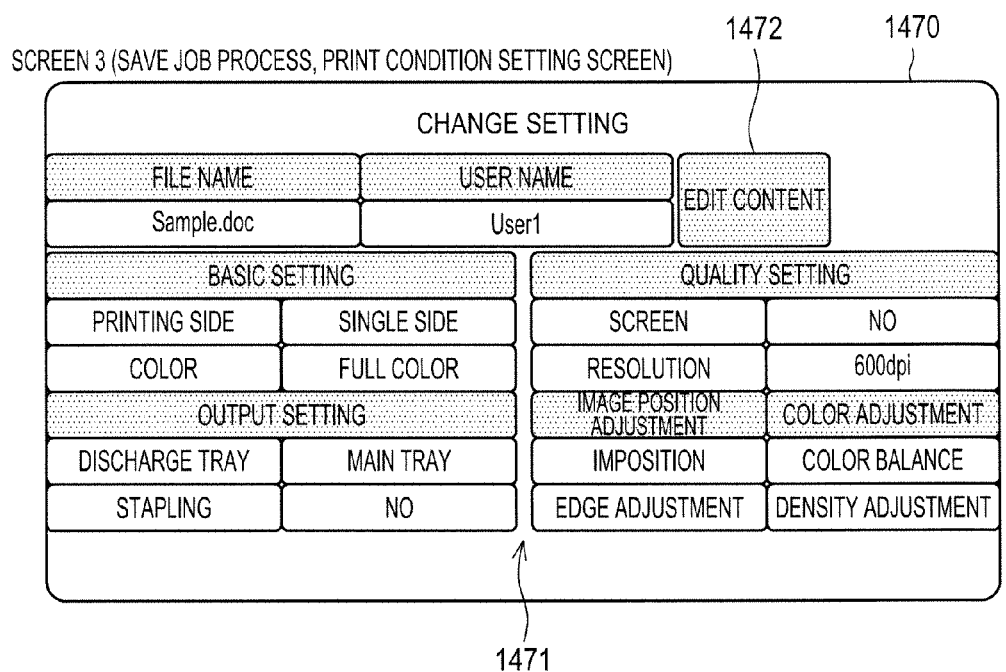
FIG. 12 is a diagram illustrating a print condition setting screen.

A setting screen 1470 is illustrated in FIG. 12. Various print conditions are displayed on the setting screen 1470, and the user can input settings of print conditions by pressing a print condition field 1471.

If the selected job is correlated with file information, an edit content button 1472 is displayed on the setting screen 1470 so that the button can be pressed.

After the setting screen 1470 is displayed (step s404), the input setting of print conditions is accepted (step s405), and it is determined whether the edit content button 1472 is operated (step s406). When the edit content button 1472 is not operated (N in step s406), it is determined whether an OK button (not illustrated) or the like for ending the process is operated (step s408). When determination to end the process is not obtained (N in step s408), the flow returns to step s405, and the input setting of print conditions is accepted. When the edit content button 1472 is operated (Y in step s406), the content edit process is performed (step s407), and the end determination is performed (step s408).

When it is determined in the end determination that the process is to be ended (Y in step s408), the print conditions are overwritten and saved to the image memory 114 or the like (step s409), and the flow returns to Procedure 2.

Figure 13:
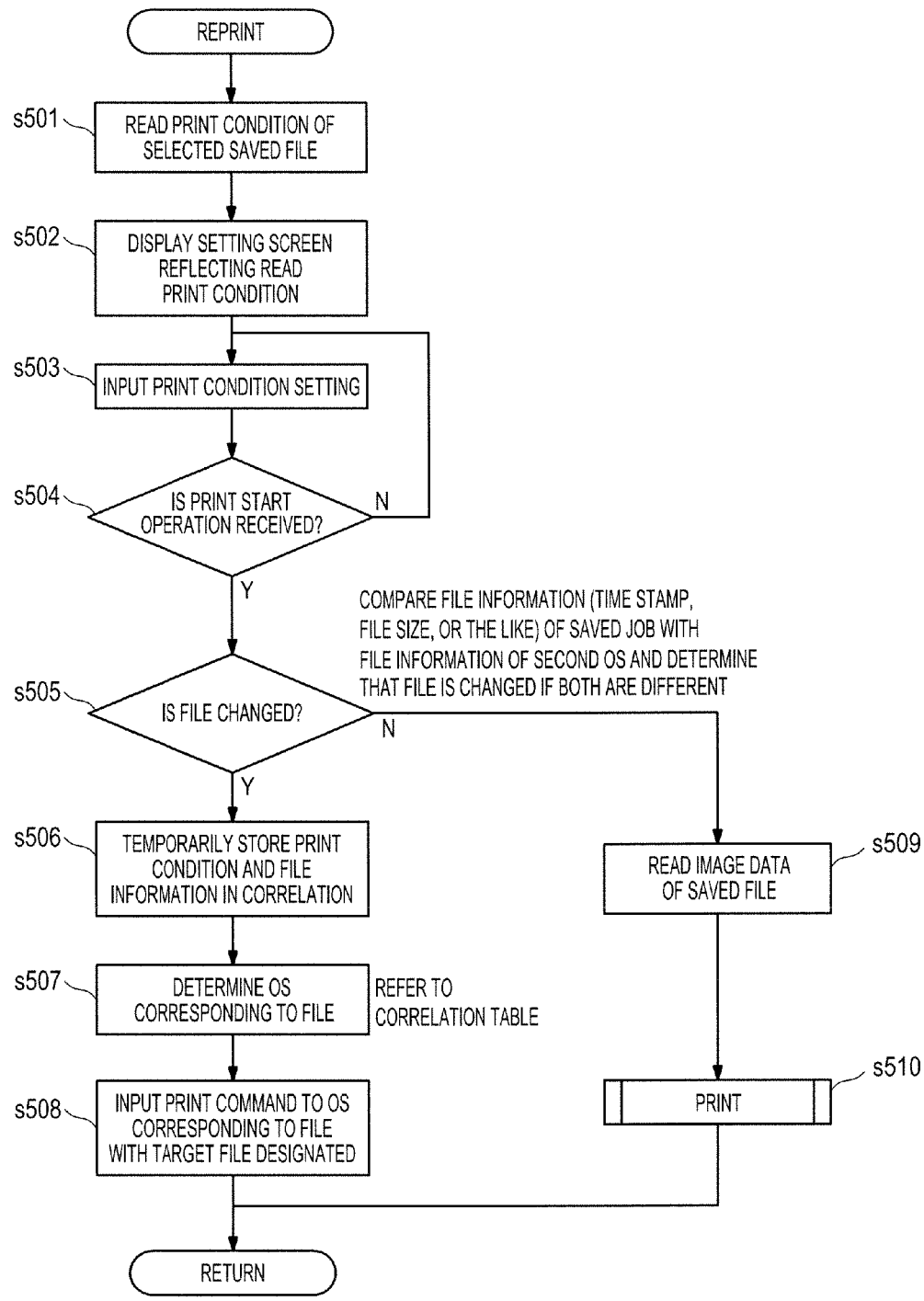
FIG. 13 is a flowchart illustrating the procedure of a reprint process.

Next, the procedure of the reprint process will be described based on the flowchart of FIG. 13.

First, the print conditions of the selected saved job are read from the image memory 114 or the like (step s501). Subsequently, a setting screen in which the read print conditions are reflected is displayed on the operating unit 140 (step s502). In this case, when there is a request to the VNC server 12 from the VNC clients 20 and 21 of the PCs 3 and 4, operation screen information is sent to the VNC clients 20 and 21, and a setting screen is similarly displayed on the operating units 30 and 40 of the PCs 3 and 4. In this case, the operation screen corresponds to the first operation screen.

Subsequently, the input setting of the print conditions is accepted on the setting screen (step s503). Standby is performed until a print start operation is received (step s504), and when the print start operation is received (Y in step s504), it is determined whether the file on the other OS side is changed (step s505).

Whether the file has been changed or not can be determined by comparing file information (a time stamp, a file size, and the like) of the saved job with file information of the file having the same file name, saved in a storage area managed by the other OS. If both pieces of information are different, it can be determined that the file has been changed.

If the determination result shows that the file has not been changed (N in step s505), the image data of the saved job is read from the image memory 114 or the like (step s509), the print process is executed (step s510), and the flow returns from the process.

On the other hand, if the determination result shows that the file has been changed (Y in step s505), print conditions and file information are temporarily stored in the RAM 112 or the like (step s506), and an OS corresponding to the file is determined (step s507). This determination can be performed by referring to a correlation table or the like illustrated in Table 1 in which files and OSs are correlated. Subsequently, a target file is designated, then a print command is input to the OS corresponding to the file (step s508), and the flow returns from the process. Moreover, even when the file information is not correlated with the selected saved job, it is determined as "Y" in step s505.

In this manner, since the presence of a change in the file is checked so that the content of the original file is changed if the file is changed, it is possible to print the latest content. Moreover, since the saved image data is printed if the file is not changed, it is possible to eliminate the time for the RIP process or the like and to execute printing quickly.

In the second and third OSs, since the command accepting Telnet is set in advance so as to be automatically activated during activation of the OSs, printing of the file is executed when the print command is received by the Telnet. Applications are also automatically activated. The printer driver of this apparatus is set as the printer drivers of the second and third OSs, and the printer driver is activated so that printing is executed.

Figure 14:
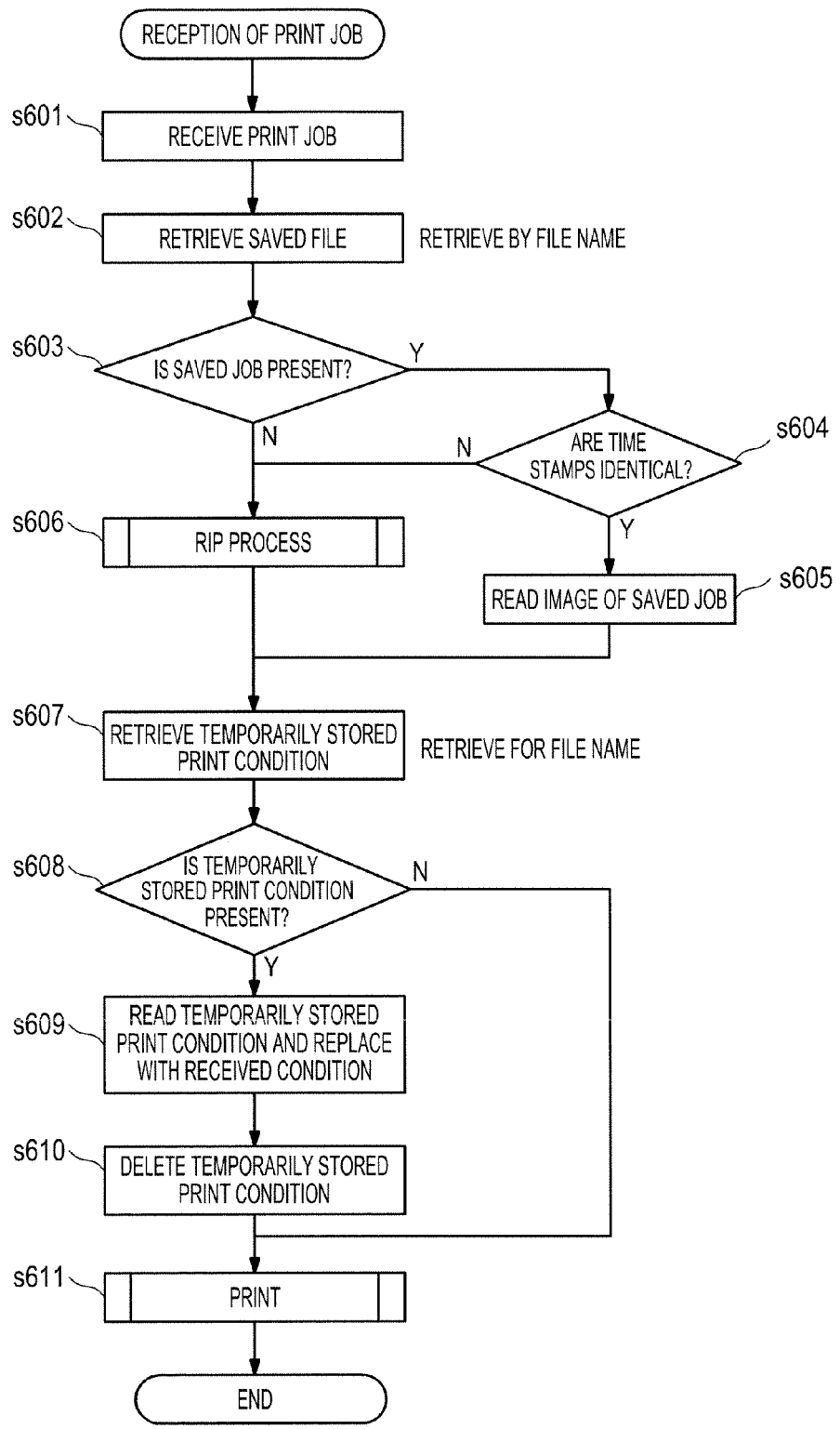
FIG. 14 is a flowchart illustrating the procedure of a print job receiving process.

Next, the procedure of a print job receiving process of the apparatus control FW will be described based on the flowchart of FIG. 14.

A print job is received as a print job by the apparatus control FW, for example, when data created by an application that operates on the second and third OSs is printed through the printer driver.

First, a print job receiving process that involves receiving image data and print conditions is executed (step s601). With respect to the received print job, a saved job is retrieved using a file name (step s602). As the result of the retrieval, it is determined whether a saved job is present (step s603).

When the saved job is present (Y in step s603), it is determined whether the time stamps of the received print job and the saved job are identical (step s604). When the time stamps are identical (Y in step s604), the image data of the saved job is read from the image memory 114 or the like (step s605).

Moreover, when the saved job is not present (N in step s603) or when the time stamps are not identical even if the saved job is present (N in step s604), the received print job is subjected to RIP process to generate image data (step s606). Further, the determination whether the print job and the saved job are identical may be performed using file information such as a file size and the other information.

In this manner, when the image data of the saved job can be used, since the saved image data can be used, it is possible to eliminate the time for the RIP process and to execute printing quickly.

After that, the flow proceeds to a process of retrieving print conditions that are temporarily stored using a file name or the like (step s607).

After the temporarily stored print conditions are retrieved (step s607), it is determined whether temporarily stored print conditions are present (step s608). When the temporarily stored print conditions are not present (N in step s608), the print process is performed (step s611, and the process ends. When the temporarily stored print conditions are present (Y in step s608) the temporarily stored print conditions are read and replaced by the conditions of the received print job (step s609), and the temporarily stored print conditions are deleted (step s610). After that, the print process is performed (step s611), and the process ends.

In general, the printer driver applies print settings set manually on the driver and jobs are input. Alternatively, when the print settings are not manually set, default print conditions are applied, and jobs are input. As described above, even when the operating unit 140 sets print conditions and issues a print instruction, since only the target file is designated and then a print command is input to the OS, the printer driver applies default print conditions. That is, the print conditions set by the operating unit 140 are not reflected on jobs transmitted by the printer driver. Thus, in steps s607 to s609, it is determined whether a received job is a job of which the print conditions are set by the operating unit 140, and if so, print conditions (default print conditions) set as a default are discarded and are replaced with the print conditions set by the operating unit 140.

Figure 15:
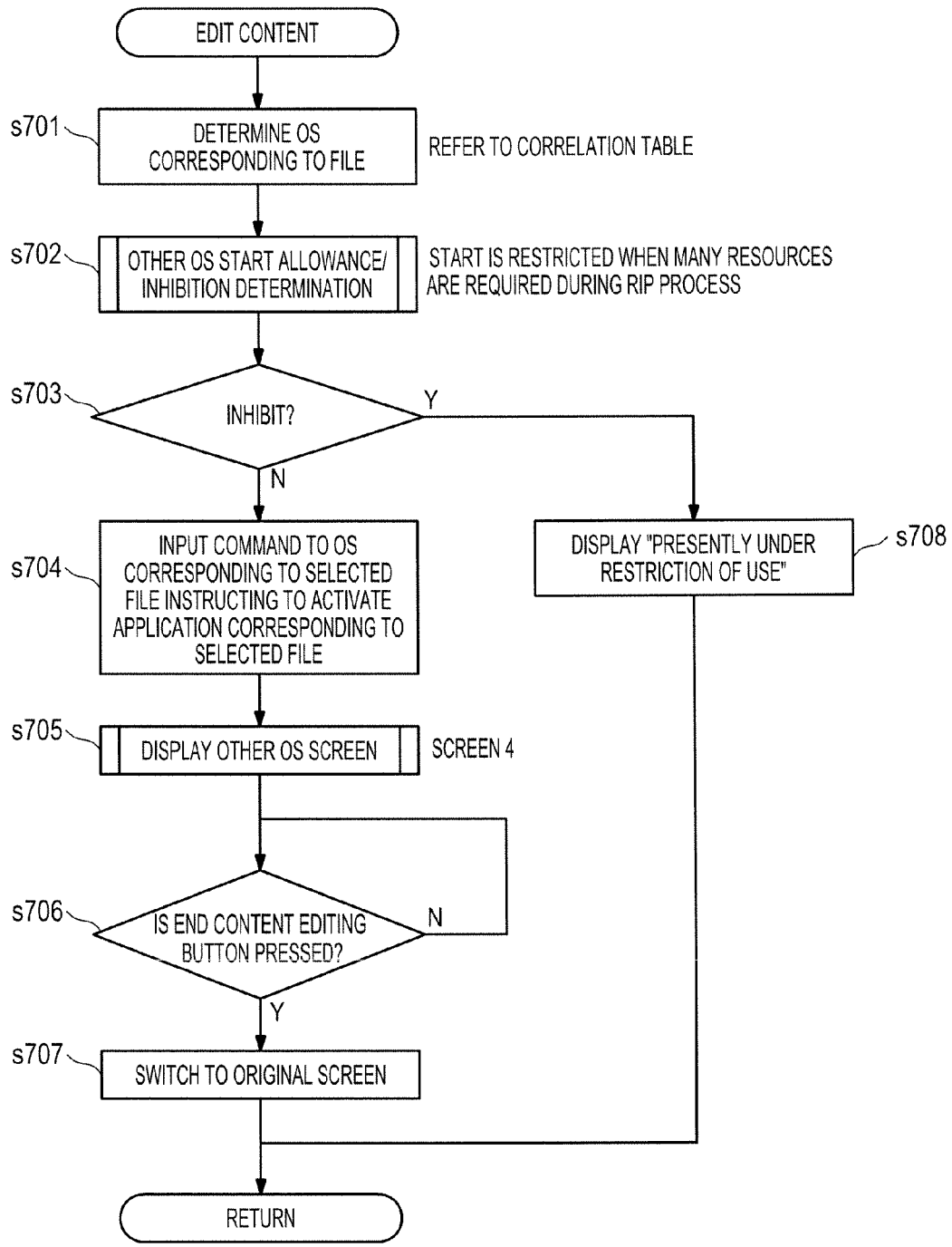
FIG. 15 is a flowchart illustrating the procedure of a content editing process.

Next, the procedure of the content edit process which is part of the overall control of the apparatus control FW will be described based on the flowchart of FIG. 15.

First, other OS corresponding to a selected file is determined using the correlation table or the like illustrated in Table 1 (step s701). Subsequently, it is determined whether the start of the other OS will be allowed or inhibited (step s702). Here, the start of the other OS means that the other OS enters into an active state and includes waking-up of the other OS in the sleep state. In determination of allowance or inhibition of the activation, it is necessary to restrict the start of the other OS in an operation state where many resources are required during the RIP process, for example, and thus, it is determined that the activation is to be inhibited. This determination to inhibit the activation may be restricted to when the start is requested from the external PCs 3 and 4, and the request to start the other OS from the operating unit 140 may be accepted regardless of the resources.

It is determined whether the determination results indicate that the other OS is to be inhibited (step s703). If the other OS is to be inhibited (Y in step s703), screen information "presently under restriction of use" is sent to the PCs 3 and 4 through the operating unit 140 or the VNC server 12, a message "presently under restriction of use" is displayed on the operation screens of the operating units 30 and 40 (step s708), and the flow returns from the process. In this case, the operation screen corresponds to the first operation screen. When the edit content button is operated through the operating unit 140, and this is excluded from inhibition, the screen message "presently under restriction of use" is not displayed on the operating unit 140.

When the other OS is not inhibited (N in step s703), a command instructing to activate an application corresponding to the selected file is input to an OS corresponding to the selected file (step s704). The command is accepted by a command accepting Telnet, and the corresponding other OS having received the command is activated, and the application corresponding to the selected file is also automatically activated. In this case, the selected file may be read and a state where the file can be edited may be created. The other OS displays an operation screen according to the activation (step s705). FIG. 16 is a display example of the other OS screen. In this example, a Windows screen 1483 is displayed so as to be fitted in a region 1482 within a screen 1480 as the other OS screen.

Moreover, when the VNC server 10 or 11 (the VNC server 10 when the other OS is Windows) is accessed from the VNC clients 20 and 21 of the PCs 3 and 4, the operation screen information of the other OS is sent to the VNC clients 20 and 21, and the other OS screen is displayed on the operating units 30 and 40 of the PCs 3 and 4. In this case, the operation screen corresponds to a second operation screen or a third operation screen. The input operation performed on the operation screens of the operating units 30 and 40 is sent to the VNC server 10 or 11 through the VNC clients 20 and 21 and is accepted by the other OS. Thus, the files of the other OS present in the image forming apparatus 1 can be edited on the PCs 3 and 4 which are the external apparatuses. When the operation screen of the other OS is provided to the PCs 3 and 4, the first operation screen generated by the apparatus control FW is displayed on the operating unit 140, and operations such as copying, scanning, or printing, of the main body of the image forming apparatus 1 can be performed.

When the edit content button is operated by the operating unit 140, the VNC server 10 or 11 sends the operation screen of the other OS to the VNC client 22, and the other OS screen is displayed on the operating unit 140. In this case, the operation screen corresponds to the second or third operation screen. The input operation performed on the operation screen by the operating unit 140 is sent to the VNC server 10 or 11 through the VNC client 22 and is accepted by the other OS.

In the present embodiment, an application of Windows is activated on the Windows screen 1483 fitted into the region 1482 so that the application can be operated. Moreover, an end button 1481 is displayed in the screen 1480 outside the region 1482 so that the button can be pressed. An operation corresponding to the operation on the region outside the region 1482 is executed by the control of the apparatus control FW.

Standby is performed until the end button 1481 is operated (step s706), and when the end button 1481 is operated, the screen is switched to the original screen (step s707), and the flow returns from the process. The switching of screen is performed by the display switching unit 143 using the rendering data held in the VRAM 113.

Figure 17:
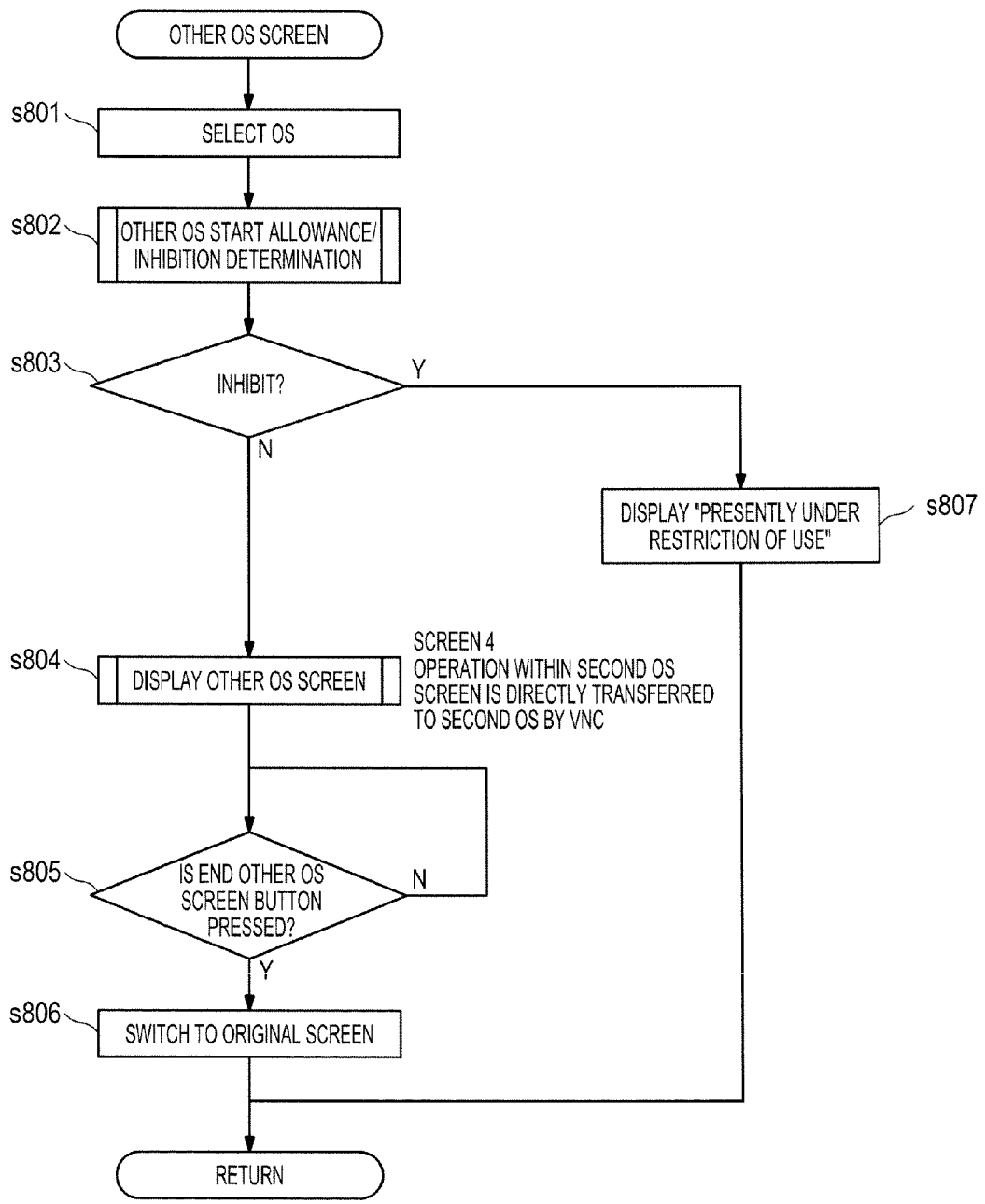
FIG. 17 is a flowchart illustrating the process procedure on other OS screen.

Next, the procedure of the other OS screen process of the apparatus control FW will be described based on the flowchart of FIG. 17.

First, an OS selection screen (not illustrated) is displayed and the user selects an OS (step s801), and it is determined whether the start of the other OS will be allowed or inhibited (step s802). In this determination, the start of the other OS is restricted in a situation where many resources are required during the RIP process, for example.

It is determined whether the determination results indicate that the other OS is to be inhibited (step s803). If the other OS is to be inhibited (Y in step s803), a message "presently under restriction of use" is displayed on the operating unit 140 or the operating units 30 and 40 of the external PCs 3 and 4 (step s807), and the flow returns from the process.

When the other OS is not inhibited (N in step s803), as illustrated in FIG. 16, a process of displaying the other OS screen on the operating unit 140 or the operating units 30 and 40 of the PCs 3 and 4 is performed (step s804).

Standby is performed until the end button 1481 is operated (step s805), and when the end button 1481 is operated, the screen is switched to the original screen (step s806), and the flow returns from the process.

Figure 18:
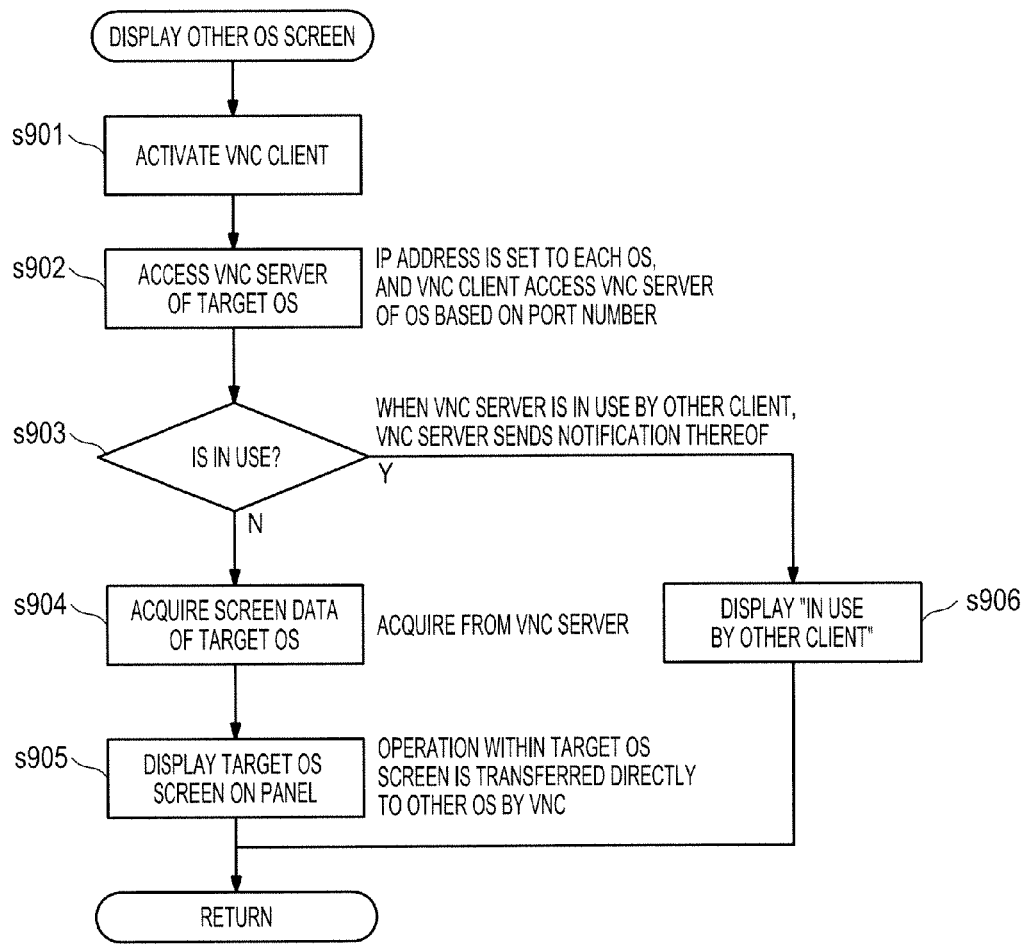
FIG. 18 is a flowchart illustrating the procedure of displaying other OS screen.

Next, the procedure of the other OS screen display process of the apparatus control FW will be described based on the flowchart of FIG. 18.

First, the apparatus control FW activates the VNC client (step s901) and accesses the VNC server of the target other OS (step s902). Here different port numbers are set to the respective VNC servers, and the VNC client accesses the VNC server of the target other OS based on the port number.

It is determined whether the VNC server to be accessed is in use (step s903). When the VNC server is in use by the other client (Y in step s903), the VNC server sends a notification thereof and the VNC client displays a message "in use by the other client" (step s906). That is, the message "in use by the other client" is displayed on the operating unit 140 or the operating units 30 and 40 of the PCs 3 and 4. After that, the flow returns from the process.

On the other hand, when the VNC server is not in use by the other client (N in step s903), the image data of the target other OS is acquired from the VNC server of the other OS (step s904), and the target other OS screen is displayed on the operating unit 140 or the operating units 30 and 40 (step s905).

The other OS screen is displayed on the operating unit 140 through the VNC client 22 by the VNC server 10 so that the screen can be operated and is also displayed on the operating unit 30 or 40 of the PC 3 or 4 through the VNC clients 20 and 21 so that the screen can be operated. This operation screen corresponds to the second or third operation screen.

For example, the operation on the Windows screen 1483 is directly transferred to the second OS by the VNC server 10. Various operations can be performed on the Windows screen 1483, and processes such as creating a new file, editing, saving, or printing can be performed by starting an application that can be activated on the Windows screen 1483. Operations can be performed on the operating unit 140 and the operating units 30 and 40 of the external PCs 3 and 4 through the VNC clients 20, 21, and 22 by the VNC server 10. When the Windows screen 1483 is displayed on the operating unit 30 or 40, the operating unit 140 can display the first operation screen and accept the input operation.

The operations within the corresponding other OS screen are directly transferred from the VNC clients 20 to 22 to the other OS through the VNC servers 10 and 11 of the other OSs. After that, the flow returns from the process.

Next, the procedure of the sleep control of the apparatus control FW will be described based on the flowchart of FIG. 19. The sleep management operates independently from the overall control routine.

First, in the sleep control during power-ON, a timer T1 starts (step s1001). Subsequently, it is determined whether an activation event corresponding to sleep extension has occurred (step s1002: Procedure 4). When an activation (sleep extension) event occurs, the first OS is activated, and the subsequent routine is executed. The activation (sleep extension) event occurs when an operation is performed on a panel, a print job is received, or printing is completed, for example. The sleep extension means delaying the time when an OS is put to a sleep state according to the activation event.

When the activation (sleep extension) event does not occur (N in step s1002), it is determined if a relation T1>t1 is satisfied (step s1005). "t1" is a predetermined time set in advance for the sleep operation and is a threshold value for determining that the sleep control is performed unless an operation or printing is performed within this predetermined time.

If the relation T1>t1 is not satisfied (N in step s1005), the flow returns to Procedure 4 and the process is continued. When the activation (sleep extension) event occurs (Y in step s1002) and a print engine is in the sleep mode, the print engine is woke up (step s1003), the time T1 is reset (step s1004), and the flow proceeds to the step (step s1005) of determining whether the relation T1>t1 is satisfied. The print engine is a device having an image forming mechanism that executes printing, a sheet conveying mechanism, a function of controlling these mechanisms and the like, for example, and corresponds to an engine of a printer unit.

The sleep state of the print engine means a state where the power supplied to the respective mechanisms is off or is in a low-power state.

On the other hand, if T1>t1 (Y in step s1005), it is determined whether the other OS is in the active state (step s1007).

When the other OS is not in the active state (N in step s1007), the print engine is put into the sleep mode (step s1011), the first OS is put into the sleep mode (step s1012), and the process ends.

When the other OS is in the active state (Y in step s1007), the flow returns to Procedure 4. In this example, although the other OS enters into the sleep mode under the conditions set in the other OS, when the other OS is in the active state, the first OS and the print engine do not enter into the sleep mode in preparation for the print instruction from the other OS.

Moreover, the procedure of another example of the sleep control of the apparatus control FW will be described based on the flowchart of FIG. 20.

The procedures of steps s1001 to s1007 are the same as the above procedures, and description thereof will not be provided here.

When it is determined in step s1007 that the other OS is not in the active state (N in step s1007), the print engine is put into the sleep mode (step s1011), the first OS is put into the sleep mode (step s1012) similarly to the above procedure, and the flow ends. The case where the other OS is not in the active state includes a case where the other OS is in the sleep mode.

When it is determined in step s1007 that the other OS is in the active state (Y in step s1007), it is determined whether an application is activated on the other OS (step s1008). When the application is not in the active state (N in step s1008), a sleep instruction is issued to the other OS (step s1010), the print engine is put into the sleep mode (step s1011), the first OS is put into the sleep mode (step s1012), and the flow ends.

On the other hand, when an application is activated on the other OS (Y in step 1008), the flow returns to Procedure 4. When the application is in use, since it is highly likely that printing will be performed later, the print engine and the first OS are not put into the sleep mode. In this case, the application is generally used at a remote site through the operating units 30 and 40 of the PCs 3 and 4. When the application is used by the operating unit 140 of the image forming apparatus 1, since a sleep extension event occurs due to the operation of the operating unit 140, this process is generally not performed.

In this manner, since the OS is put into the sleep mode only when an application is not used, the operation such as file editing of the user is prevented from being interrupted.

In addition, the procedure of further another example of the sleep control of the apparatus control FW will be described based on the flowchart of FIG. 21.

The procedures of steps s1001 to s1008 are the same as the above procedures, and description thereof will not be provided here.

In step s1008, when an application is not activated on the other OS (N in step s1008), a sleep instruction is issued to the other OS (step s1010), the print engine is put into the sleep mode (step s1011), the first OS is put into the sleep mode (step s1012) similarly to the above procedure, and the flow ends.

On the other hand, when an application is activated on the other OS (Y in step s1008), it is determined whether the active application is a specific application (step s1013). The specific application is registered in advance. In general, an application associated with printing is registered as the specific application. Moreover, the user may register a new application and change the registered application. In this case, the active application is used at a remote site through the operating units 30 and 40 of the PCs 3 and 4 similarly to the above procedure.

After determining whether the application is a specific application, it is determined whether the specific application is active (step s1014). When the specific application is active (Y in step s1014), since it is highly likely that printing is executed, the flow returns to Procedure 4 without putting the print engine into the sleep mode. In this manner, when the user wants to perform printing from the specific application, printing can be executed immediately. When the specific application is not active (N in step s1014), since the application that is not associated with printing is executed, the print engine is put into the sleep mode and then the flow returns to Procedure 4. In this manner, it is possible to reduce power consumption. The reason why only the print engine is put into the sleep mode is because in the present embodiment, the other OS is operating on the first OS, and if the first OS is put into the sleep mode, it is not possible to use the other OS.

When it is determined in the above procedure that the specific application is not active (N in step s1014), the user may be asked whether the print engine or the like will be put into the sleep mode, and it may be determined whether the print engine or the like will be put into the sleep mode based on the user's operation. In this manner, it is possible to prevent the sleep mode from being activated contrary to the user's intention.

Figure 19:
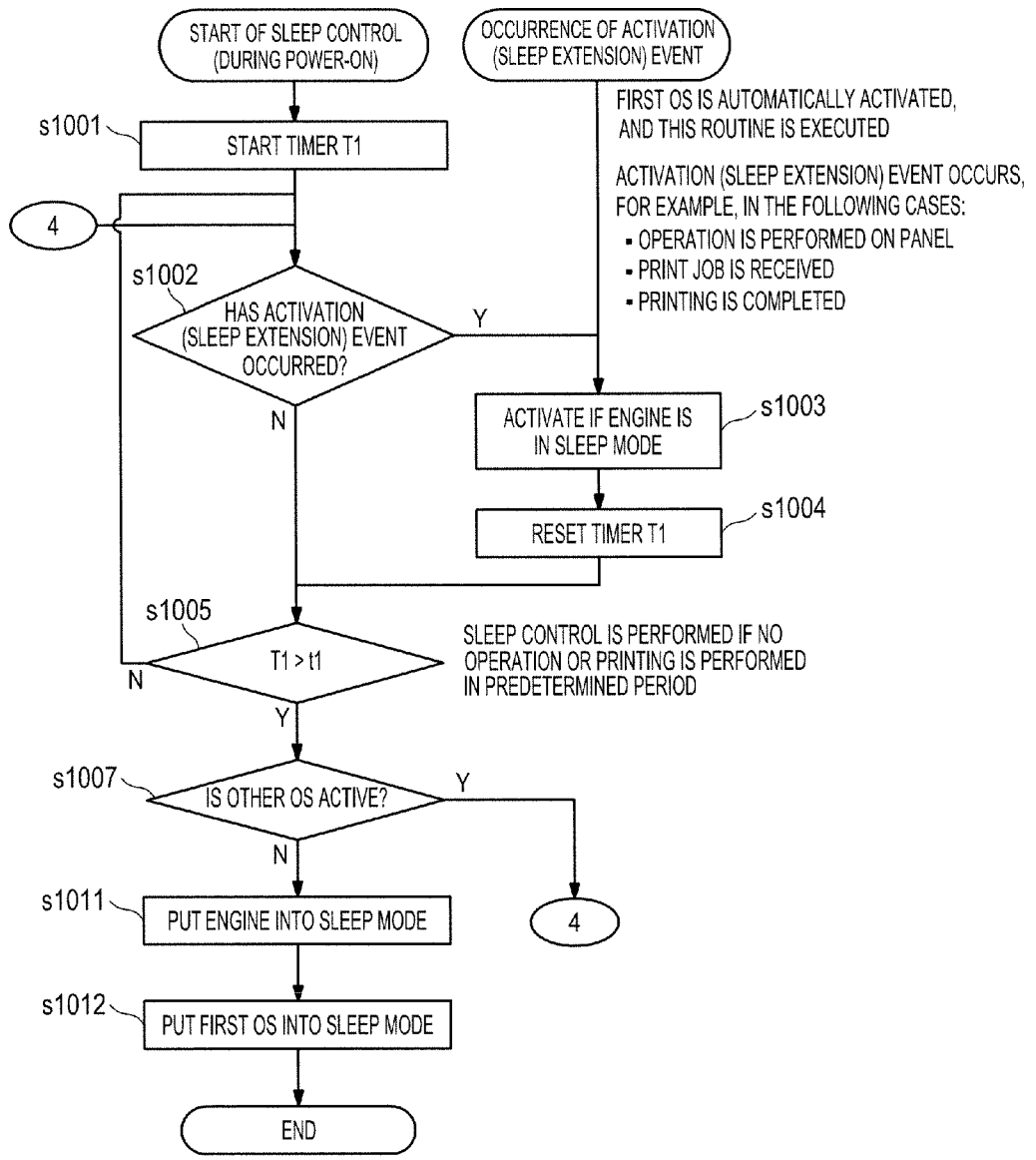
FIG. 19 is a flowchart illustrating the procedure of sleep control.
Figure 20:
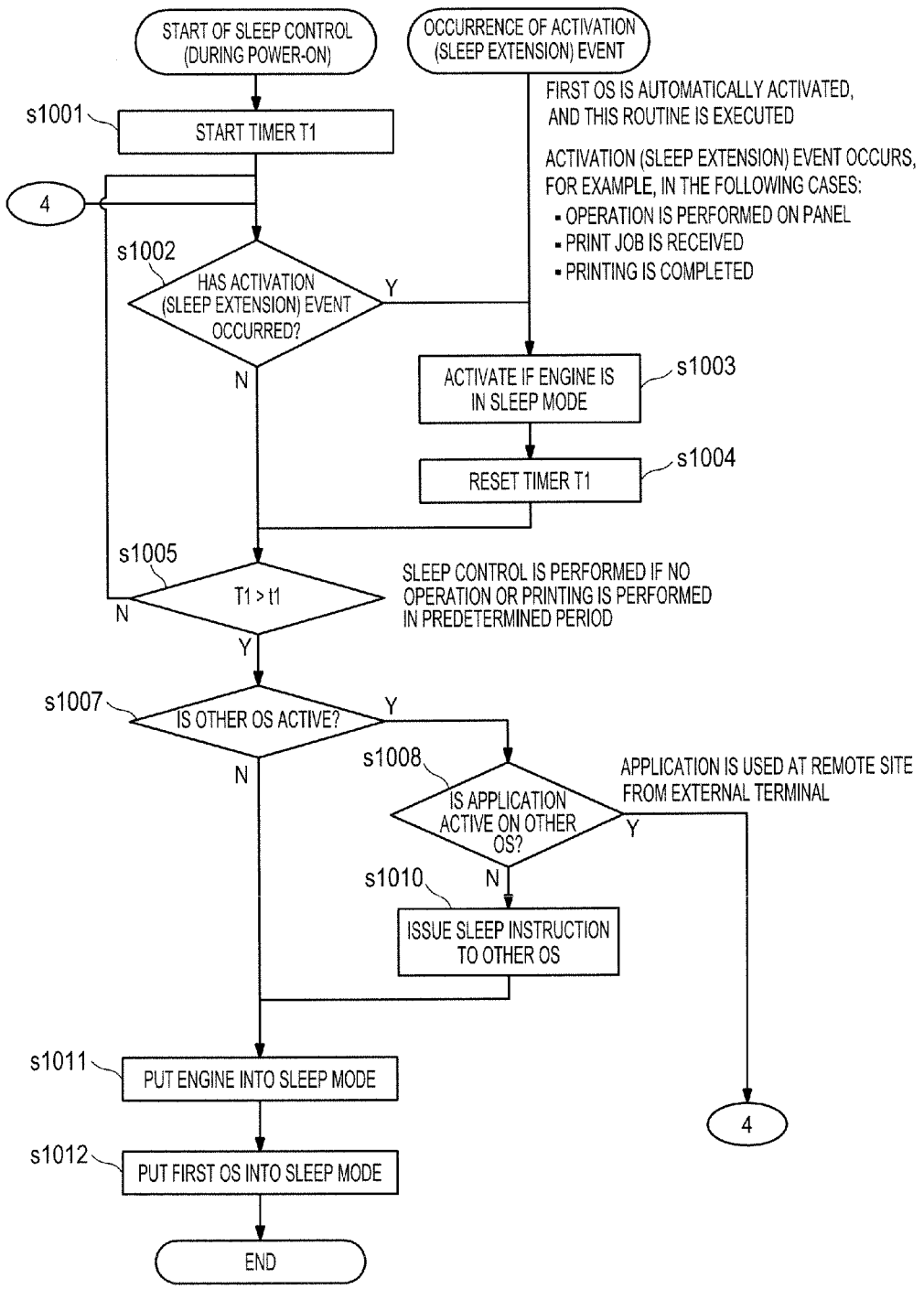
FIG. 20 is a flowchart illustrating the procedure of another example of sleep control.
Figure 21:
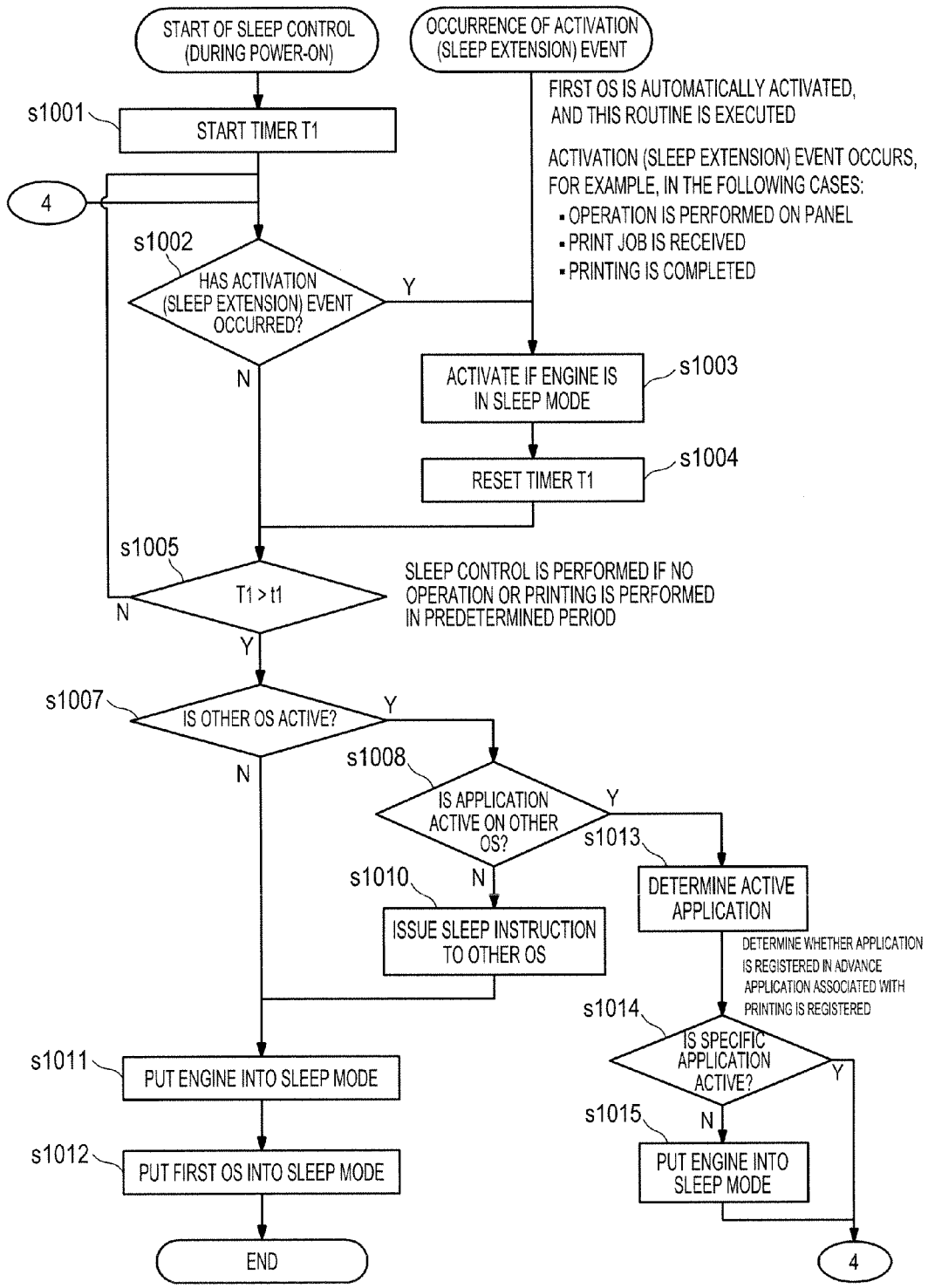
FIG. 21 is a flowchart illustrating the procedure of further another example of sleep control.

Any one of the procedures of FIGS. 19 to 21 may be set, and any one of them may be set as a default procedure and the user may select and set a default procedure.

Figure 22:
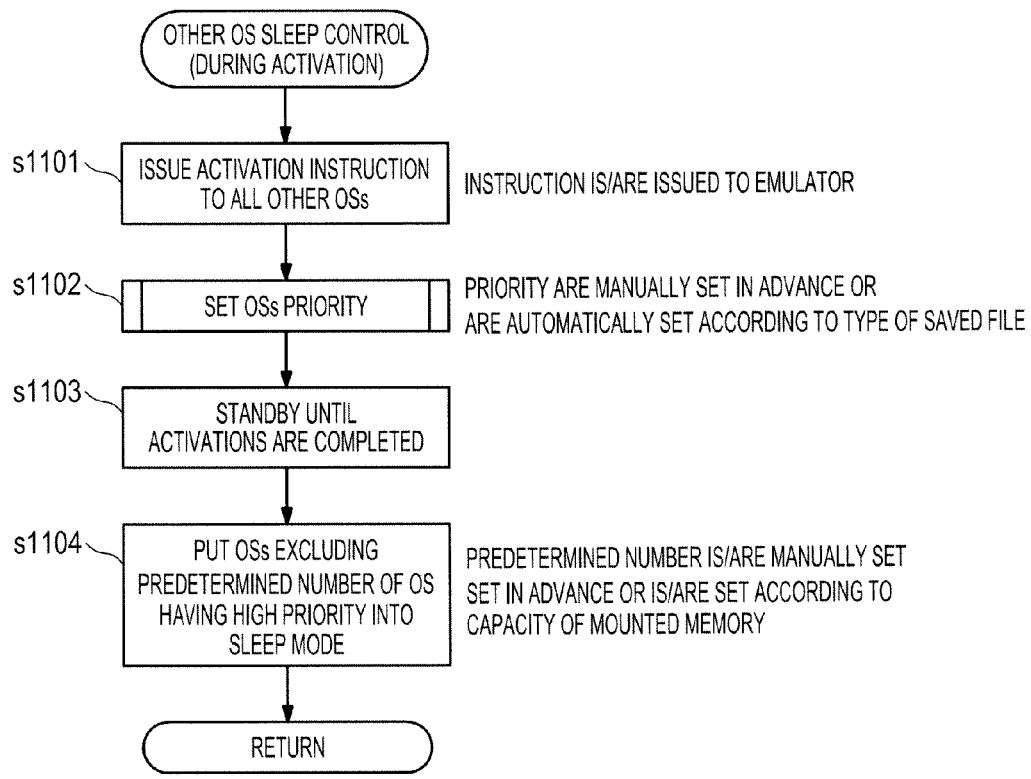
FIG. 22 is a flowchart illustrating the procedure of other OS sleep control during activation.

Next, the procedure of other OS sleep control (during activation) which is part of the overall control of the apparatus control FW will be described based on the flowchart of FIG. 22 (the processing details of step s102 of FIG. 5).

First, the first OS is activated to issue an activation instruction to all other OSs (the second to N-th OSs) (step s1101). The activation instruction to the other OSs is issued to the emulator. Subsequently, a process of setting OS priority is performed step s1102). The priority is determined by predetermined manual setting or automatic setting based on the type or the like of saved files.

In the manual setting, the priority of OSs is determined based on the priority of each OS set in advance according to the user's instruction or the like or the priority set for applications or files to be used. When the priority is automatically set based on the type of saved files, an OS correlated with saved jobs is preferentially activated, and the other OSs are put into the sleep mode. Moreover, a correlated OS having a large number of saved job files may have high priority. In addition, the priority may be determined based on the frequency of use or the access time or according to a combination of both.

Subsequently, standby is performed until the activation of the respective OSs is completed (step s1103), OSs other than a predetermined number of OSs having higher priority are put into the sleep mode (step s1104). In this case, the predetermined number is manually set in advance or is automatically set according to the capacity of a mounted memory or the like. After that, the flow returns from the process.

In this manner, by limiting the number of OSs that are in the active state, it is possible to secure resources required for image formation and to prevent degradation of apparatus performance. Moreover, when an OS is put into the sleep state, the content of the memory is saved in a hard disk or the like, and this process takes some time. If the sleep process is performed when a job is input and resources are required, the time required for saving the memory content may degrade the performance of job execution. In the present embodiment, since the sleep process is performed immediately during power-ON It is possible to prevent this problem as much as possible. Since the time required for waking up an OS in the sleep state is considerably shorter than the time required for activating an OS, the decrease in the user's convenience is also small.

Figure 23:
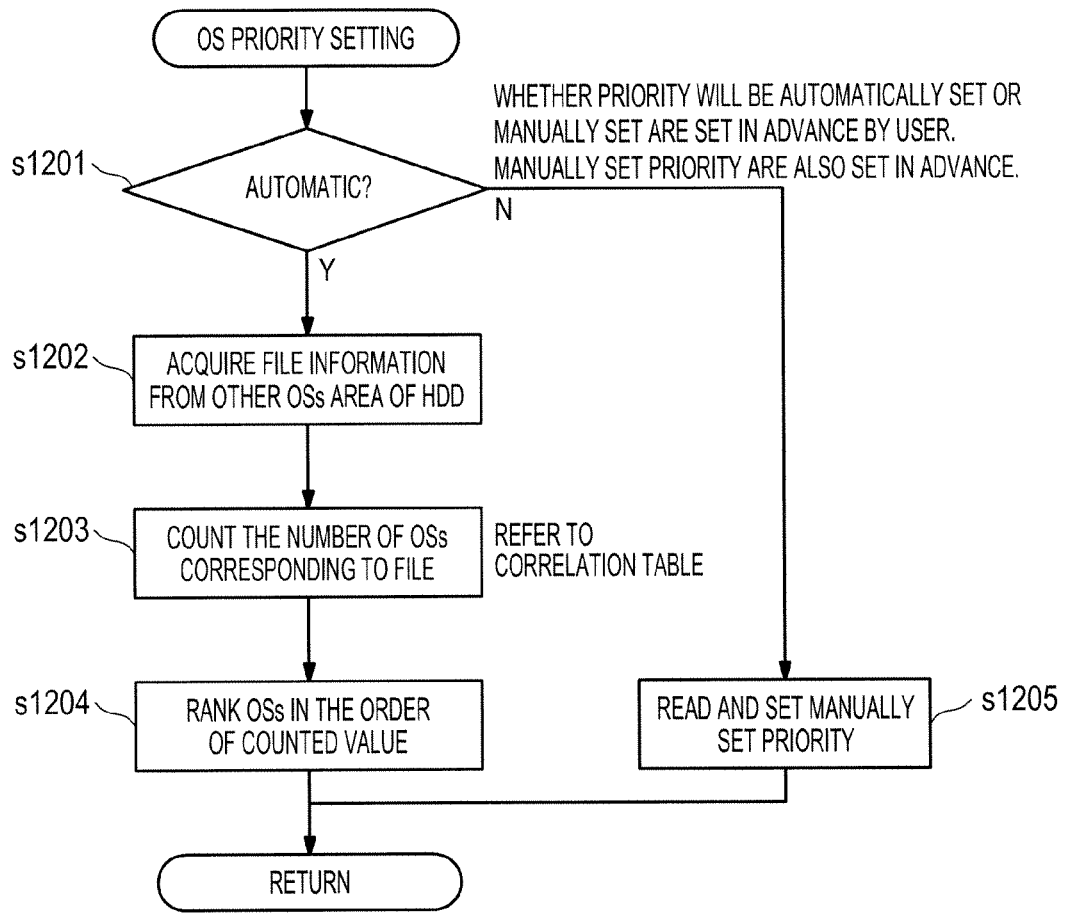
FIG. 23 is a flowchart illustrating the procedure of setting OS priority.
Figure 24:
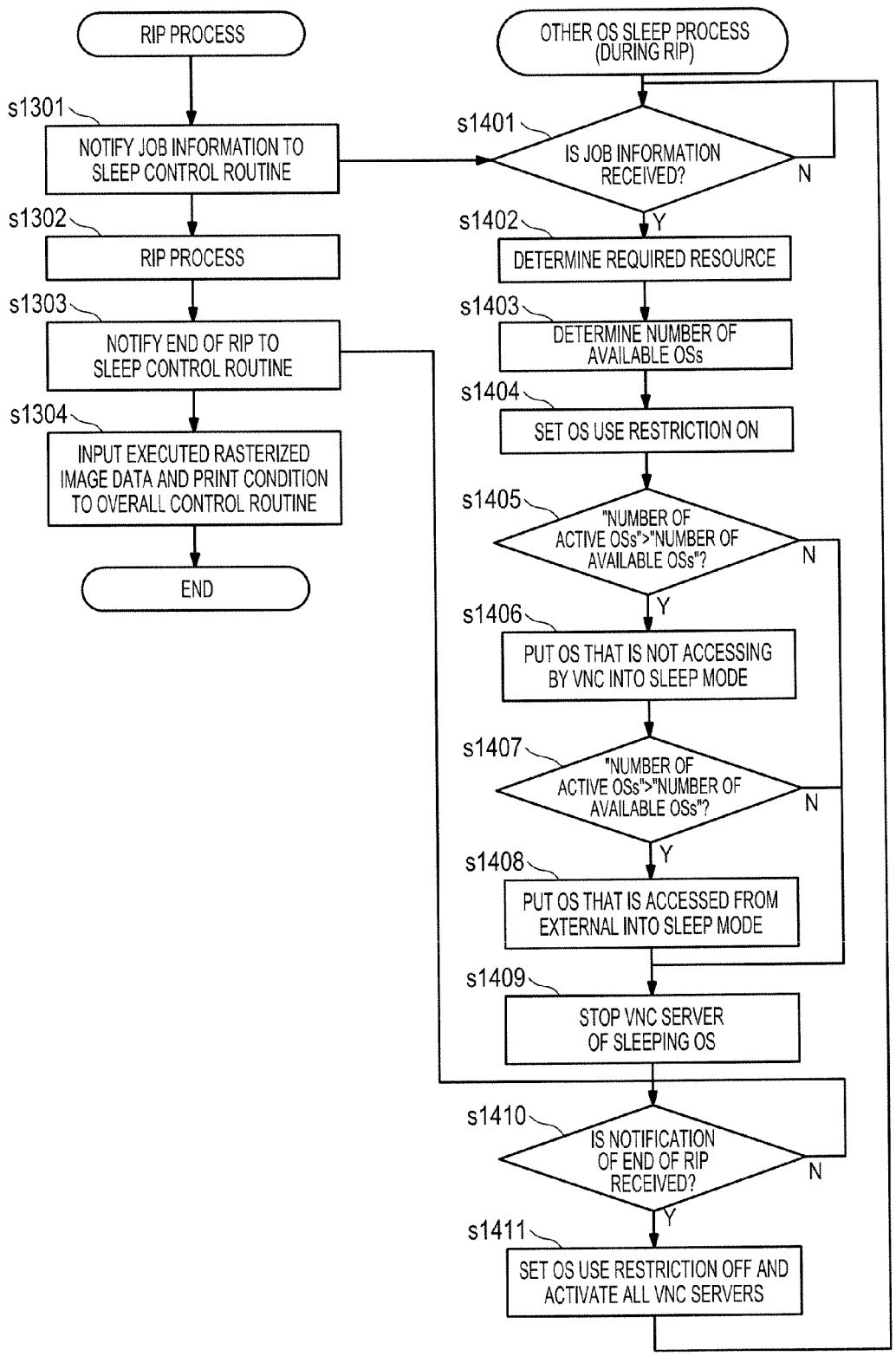
FIG. 24 is a flowchart illustrating the procedure of a RIP process and the procedure of other OS sleep control during the RIP process.

Next, the procedure of an OS priority setting process in the overall control of the apparatus control FW will be described based on the flowchart of FIG. 23.

First, it is determined whether the OS priority setting is automatic setting (step s1201). Whether the priority will be automatically set or manually set is set in advance by the user. The priority when it is set manually is also set in advance.

When the OS priority setting is not automatic setting (N in step s1201), the priority of the manual setting is read from the HDD 115 or the like and set (step s1205), and the flow returns from the process.

When the OS priority setting is automatic setting (Y in step s1201), file information is acquired from the other OS area of the HDD 115 (step s1202), and OSs corresponding to the file are counted by referring to the correlation table or the like illustrated in Table 1 (step s1203). The OSs are ranked in the order of the count (step s1204), and the flow returns from the process.

In this example, although the priority is set according to the number of correlated files as the manual setting, the automatic setting method is not limited to this.

In this manner, since an OS having low priority is preferentially put into the sleep mode, it is possible to prevent degradation of user-friendliness.

Next, the procedure of the RIP process of the apparatus control FW and the procedure of the other OS sleep control process during the RIP process will be described based on the flowchart of Fi 24. The control during the RIP process operates independently from the overall control routine.

First, received job information is notified to the sleep control routine (step s1301), and the RIP process starts (step s1302). When the RIP process ends, the end of RIP is notified to the sleep control routine (step s1303), the rasterized image data and print conditions are input to the overall control routine (step s1304), and the RIP process procedure ends.

On the other hand, in the other OS sleep control routine during the RIP process, standby is performed until job information is received (step s1401), and when the job information is received by the notification of step s1301 (Y in step s1401), resources required for the RIP process are determined (step s1402). The required resources can be determined by determining the level of required resources (CPU, memory, or the like) based on a job volume (data quantity or the like). As the result of determination, the number of OSs that can be used during the RIP process is determined (step s1403). The number of available OSs can be determined by automatically setting the number (0 to n) (n is a positive integer) according to the determined level. The level and the number are stored in the HDD 115 and like in correlation so that they can be read.

For example, in the case of automatically setting the number according to the hardware resources, when it is determined that hardware resources required for a predetermined print process are not satisfied, the number of OSs that can be activated is determined according to the use rate of resources, and the other OSs (for example, non-used OSs) having low priority are put into the sleep mode. For example, the number of OSs that can be activated is restricted up to three if the use rate of the CPU, the memory, and the HDD exceeds 50%, for example, when information is acquired through the first OS. Further, the number of available OSs can be determined in such a way that activation restriction is performed if the HDD performance does not satisfy a transmission speed of 100 MB/sec when information is acquired through the apparatus control FW and that activation restriction is performed if the transmission speed as the network performance is lower than 50% of the maximum transmission speed.

In addition, automatic setting may be performed according to a print job. A controller that performs the RIP process acquires an image size, a data format, the number of pages, a layout, and the like from the header information of the received print job and calculates resource information required for the RIP process in advance. OS activation is restricted based on the calculation result.

For example, the controller may calculate that a memory of 200 MB, a CPU having occupancy of 30% with 2 cores, and an HDD of 200 MB are required from the information of an image size (A4), a format (PS), pages (10), and a layout (2 in 1).

After the number of OSs available during the RIP process is determined (step s1403), OS use restriction is set ON (step s1404), and it is determined whether "the number of active OSs">"the number of available OSs" (step s1405). If "the number of active OSs">"the number of available OSs" (Y in step s1405), the other OSs in which the VNC server is not accessed are put into the sleep mode (step s1406), and it is determined again whether "the number of active OSs">"the number of available OSs" (step s1407). If "the number of active OSs">"the number of available OSs" (Y in step s1407), the other OSs that are accessed from outside are put into the sleep mode (step s1408), and the VNC servers of the other sleeping OSs are stopped (step s1409).

When it is determined in step s1405 and s1407 that "the number of active OSs" "the number of available OSs" is not true, the VNC servers of the other sleeping OSs are stopped without putting additional other OS into the sleep mode (step s1409). By stopping the VNC servers, the other OS that is accessed from outside is inhibited from waking up from the sleep mode. However, the access from the operating unit 140 to the VNC server is allowed up to the number of available OSs. Moreover, activation of other OS according to a print command without via the VNC server is still allowed.

After the VNC servers of the other sleeping OSs are stopped, standby is performed until notification of the end of the RIP process is received (step s1410). When the notification (s1303) of the end of the RIP process by the RIP process procedure is received (Y in step s1410), the OS use restriction is set off, all VNC servers are activated, and the flow proceeds to the step (step s1401) of performing standby until the job information is received.

In this manner, in the present embodiment, since highest priority is assigned to job execution so that required resources are secured for the job execution, it is possible to prevent degradation of the performance of printing which is the primary function of the image forming apparatus. Further, in the use restriction (sleep control) of the other OSs, first, non-used OSs are put into the sleep mode, and subsequently, OSs that are used from the external PCs are put into the sleep mode earlier than OSs that are used from the operating unit of the image forming apparatus. Thus, it is possible to maintain the convenience of the user that directly uses the image forming apparatus.

In the sleep process of the other OSs, the memory state of the active state is saved in the HDD, and the memory is released. On the first OS side, the HDD is stopped if the HDD is not used. Waking up of the second to N-th OSs involves securing memory areas for the second to N-th OSs, deploying the previous memory information in the HDD, and loading OSs.

Figure 25:
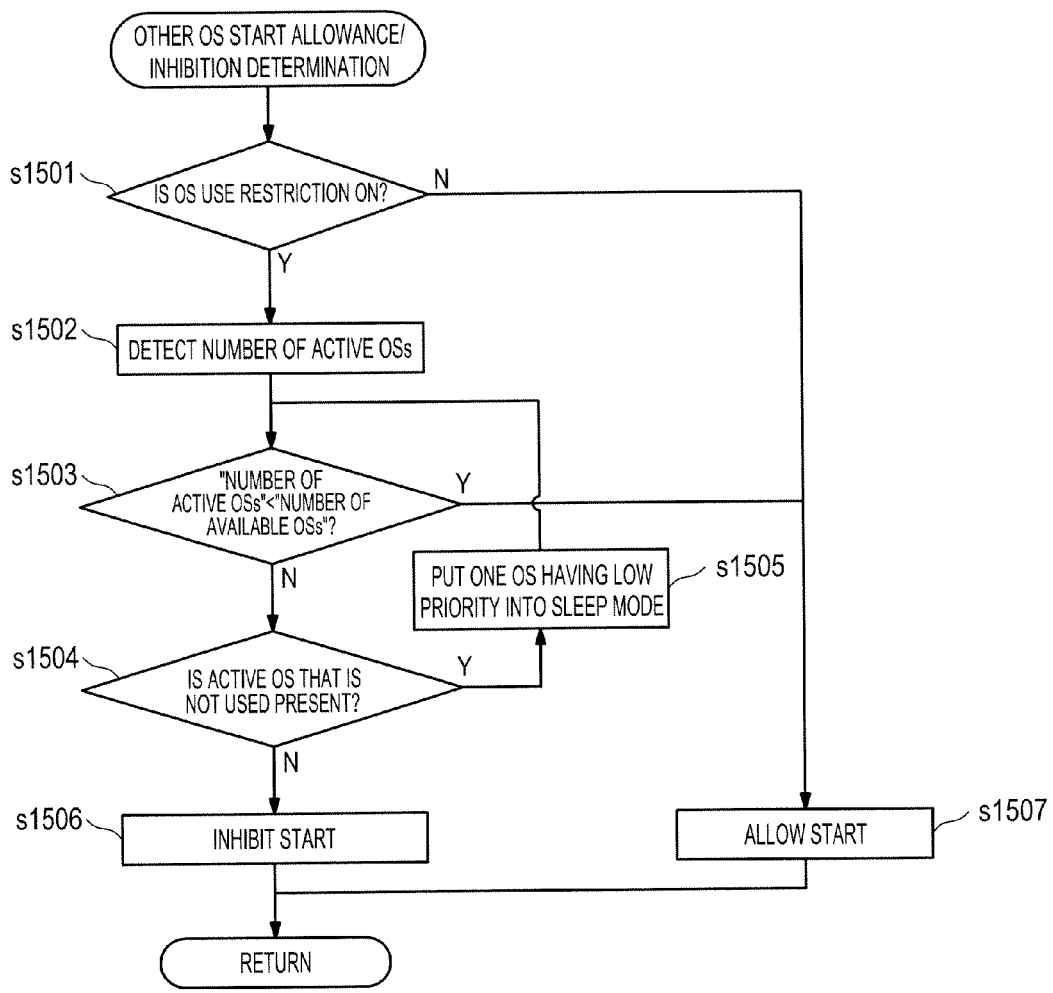
FIG. 25 is a flowchart illustrating the procedure of other OS start allowance/inhibition determination.

Next, the procedure of an other OS start allowance/inhibition determining process in the overall control of the apparatus control FW will be described based on the flowchart of FIG. 25.

First, it is determined whether OS use restriction is set ON (step s1501). When the OS use restriction is not set ON (N in step s1501), the start of the other OSs is allowed (step s1507), and the flow returns from the process. Here, the start of the other OSs means the other OSs enter into the active state and includes waking up of the other sleeping OSs.

On the other hand, when the OS use restriction is set ON (Y in step s1501), the number of active OSs is detected (step s1502), and it is determined whether "the number of active OSs"<"the number of available OSs" (step s1503). If "the number of active OSs"<"the number of available OSs" (Y in step s1503), the start of the other OSs is allowed (step s1507), and the flow returns from the process. If "the number of active OSs"<"the number of available OSs" is not true (N in step s1503), it is determined whether there is the other active OS that is not used (step s1504). If there is not the other active OS that is not used (N in step s1504), the start of the other OS is inhibited (step s1506), and the flow returns from the process. If there is the other active OS that is not used (Y in step s1504), one other OS having low priority among the other active OSs is put into the sleep mode (step s1505), and again the determination as to whether "the number of active OSs"<"the number of available OSs"(step s1503) and the subsequent steps are repeated.

With the configuration as described above, it is possible to realize a multi-OS operation with limited resources and to perform the print process in a more stable manner. In addition, since the use of OSs is restricted by taking priority into consideration, it is possible to suppress degradation of user's convenience as much as possible. Moreover, it is possible to shorten the activation (wake-up) time of the respective OSs.

As described above, according to the present embodiment, it is possible to allow the user to perform operations such as editing of data on the image forming apparatus with the aid of applications operating on the second to N-th operating systems to improve the user-friendliness.

While the invention has been described based on the embodiment, the invention is not limited to the content of the above description but can be appropriately changed unless the changes depart from the scope of the invention.

As described above, according to the present embodiment, it is possible to operate second to N-th (N is an integer of 2 or more) operating systems different from a first operating system to improve the user-friendliness, allow transitioning to the sleep mode for saving power, and reduce the warm-up time under a multi-OS environment to improve processing efficiency.

In addition, according to the present embodiment, it is possible to allow the user to perform operations such as editing of data on the image forming apparatus with the aid of applications operating on the second to N-th operating systems to improve the user-friendliness, realize the operation of a plurality of operating systems with limited hardware resources and to perform a print process in a more stable manner.

While the invention has been described based on the embodiment, the invention is not limited to the content of the above description but can be appropriately changed unless the changes depart from the scope of the invention.

Supplementary notes described below are also examples of the above embodiments.

(Supplementary Note 1)

An image forming apparatus including:

a printer unit that forms an image based on image data and outputs the image on a sheet;

a storage unit; and a control unit that controls hardware resources of the image forming apparatus including at least the printer unit and the storage unit by executing a first operating system that is activated on the image forming apparatus and a control program operating on the first operating system and that can execute second to N-th (N is an integer of 2 or more) operating systems that activate at least one application and an emulator that is disposed between the first operating system and the second to N-th operating systems to allow the second to N-th operating systems to operate on the first operating system, wherein the control unit causes at least one of the second to N-th operating systems that are operated by the emulator to enter into a sleep mode according to a priority by the control program operating on the first operating system.

(Supplementary Note 2)

The image forming apparatus according to supplementary note 1, wherein the control unit causes the second to N-th operating systems to be activated by the emulator when the first operating system is activated to operate the control program and then causes at least one of the second to N-th operating systems to enter into the sleep mode according to the priority, by the control program.

(Supplementary Note 3)

The image forming apparatus according to supplementary note 1, wherein the control unit causes at least one of the active second to N-th operating systems to enter into the sleep mode according to the priority and according to an operation state of the image forming apparatus.

(Supplementary Note 4)

The image forming apparatus according to supplementary note 3, wherein the control unit determines a level of hardware resources necessary for a RIP process in order to determine the operation state.

(Supplementary Note 5)

The image forming apparatus according to supplementary note 1, wherein the priority is set in advance.

(Supplementary Note 6)

The image forming apparatus according to supplementary note 1, wherein the priority is automatically set by the control unit.

(Supplementary Note 7)

The image forming apparatus according to supplementary note 6, wherein the control unit stores files created by the applications and the second to N-th operating systems that activate the applications that create the files in the storage unit in correlation and sets the priority according to the second to N-th operating systems correlated with the files stored in the storage unit.

(Supplementary Note 8)

The image forming apparatus according to supplementary note 7, wherein the control unit counts the number of second to N-th operating systems correlated with each of the files stored in the storage unit and sets the priority so that the operating system having a larger count has a higher priority.

(Supplementary Note 9)

The image forming apparatus according to supplementary note 1, wherein when the number of active operating systems among the second to N-th operating systems exceeds a predetermined number, the control unit causes a number of the operating systems exceeding the predetermined number to enter into the sleep mode according to the priority.

(Supplementary Note 10)

The image forming apparatus according to supplementary note 9, wherein the control unit causes another operating system having a lower priority to enter into the sleep mode while maintaining the predetermined number of operating systems having a high priority among the active second to N-th operating systems in the active state.

(Supplementary Note 11)

The image forming apparatus according to supplementary note 9, wherein the control unit allows the predetermined number to be manually set.

(Supplementary Note 12)

The image forming apparatus according to supplementary note 9, wherein the control unit automatically sets the predetermined number.

(Supplementary Note 13)

The image forming apparatus according to supplementary note 12, wherein the control unit determines the predetermined number according to a use rate of the hardware resources.

(Supplementary Note 14)

The image forming apparatus according to supplementary note 12, wherein the control unit determines the predetermined number according to the content of a print job.

(Supplementary Note 15)

The image forming apparatus according to supplementary note 9, wherein when the number of active operating systems exceeds the predetermined number, the control unit causes the operating system that is active but is not in use to preferentially enter in to the sleep mode.

(Supplementary Note 16)

The image forming apparatus according to supplementary note 9, wherein when the number of active operating systems exceeds the predetermined number and there is no operating system that is not in use, the control unit inhibits the start of the sleeping operating system.

(Supplementary Note 17)

The image forming apparatus according to supplementary note 9, wherein the control unit can operate an operation screen server that provides information on at least one of second to N-th operation screens of the second to N-th operating systems to at least one of external apparatuses connected to the image forming apparatus via a network and that accepts an input operation on the second to N-th operation screens provided to the external apparatus, and when the number of active operating systems exceeds the predetermined number, the control unit causes the operating system which is not accessed from the external apparatus through the operation screen server among the active operating systems to enter into the sleep mode.

(Supplementary Note 18)

The image forming apparatus according to supplementary note 17, wherein when the number of active operating systems exceeds the predetermined number and the active operating systems do not include an operating system which is not accessed from the external apparatus through the operation screen server, the control unit causes the operating system that is accessed from the external apparatus to preferentially enter into the sleep mode and stops the operation of the operation screen server on the operating system.

(Supplementary Note 19)

The image forming apparatus according to supplementary note 9, wherein when there is no use limitation on the second to N-th operating systems or the number of active operating systems has not reached the predetermined number, the control unit allows the start of the sleeping operating system.

(Supplementary Note 20)

The image forming apparatus according to supplementary note 9, wherein the predetermined number is the number of available operating systems.

(Supplementary Note 21)

A method of controlling an image forming apparatus including:

a printer unit that forms an image based on image data and outputs the image on a sheet; and a storage unit, the method controlling hardware resources of the image forming apparatus including at least the printer unit and the storage unit by executing a first operating system that is activated on the image forming apparatus and a control program operating on the first operating system, the method including the steps of:

executing second to N-th (N is an integer of 2 or more) operating systems that activate at least one application and an emulator that is disposed between the first operating system and the second to N-th operating systems to allow the second to N-th operating systems to operate on the first operating system; and causing at least one of the second to N-th operating systems that are operated by the emulator according to the control program operating on the first operating system to enter into a sleep mode according to a priority.

CROSS-REFERENCE TO RELATED APPLICATION

This application is based on Japanese Patent Application No. 2012-178986, No. 2012-178983 filed with Japan Patent Office on Aug. 10, 2012, the entire content of which is hereby incorporated by references.

What is claimed is:

1. An image forming apparatus comprising:
a printer unit to form an image based on image data and output the image on a sheet;
a storage unit storing a first operating system and second to N-th (N is an integer of 2 or more) operating systems; and
a control unit that controls hardware resources of the image forming apparatus including at least the printer unit and the storage unit by executing the first operating system that is activated on the image forming apparatus and a control program operating on the first operating system and that can execute the second to N-th operating systems that activate at least one or more applications and an emulator that is disposed between the first operating system and the second to N-th operating systems to allow the second to N-th operating systems to operate on the first operating system, wherein
the control unit can cause the first operating system to enter into a sleep mode and inhibits the first operating system from entering into the sleep mode when at least one of the second to N-th operating systems is active, and the emulator emulates hardware on which the second to N-th operating systems operate.

2. The image forming apparatus according to claim 1, wherein
the second to N-th operating systems can activate at least one or more applications that handles data.

3. The image forming apparatus according to claim 2, wherein
the control unit inhibits the first operating system from entering into the sleep mode when any one of the second to N-th operating systems is active and at least one or more of the applications is active.

4. The image forming apparatus according to claim 2, wherein
the control unit inhibits the first operating system from entering into the sleep mode when any one of the second to N-th operating systems is active and at least one or more of the applications that are registered is active.

5. The image forming apparatus according to claim 4, wherein
the control unit causes an engine of the printer unit to enter into a sleep mode while maintaining the first operating system in the active state when any one of the second to N-th operating systems is active and only an application other than the registered applications among the applications is active.

6. The image forming apparatus according to claim 2, wherein
the control unit enables the first operating system to enter into the sleep mode when any one of the second to N-th operating systems is active and the applications are not active.

7. The image forming apparatus according to claim 4, further comprising:
an operating unit that accepts an input operation, wherein
the control unit enables the applications to be set and registered through the operating unit.

8. The image forming apparatus according to claim 1, wherein
the control unit causes an engine of the printer unit to enter into a sleep mode when the first operating system enters into the sleep mode.

9. The image forming apparatus according to claim 1, wherein
the control unit can cause the second to N-th operating systems to enter into a sleep mode.

10. The image forming apparatus according to claim 1, wherein
the control unit has a power saving mode in which an engine of the printer unit enters into a sleep mode without causing the first operating system to enter into the sleep mode.

11. The image forming apparatus according to claim 1, wherein the control program allows or inhibits entering into the sleep mode.

12. The image forming apparatus according to claim 1, wherein
the control unit causes the first operating system to enter into the sleep mode when predetermined conditions are satisfied and any one of the second to N-th operating systems is not operating.

13. The image forming apparatus according to claim 12, wherein
the predetermined conditions are a case where no operation has been performed on the image forming apparatus for a predetermined period in an idle state of no job.

14. The image forming apparatus according to claim 1, wherein
at least one of the second to N-th operating systems can directly access at least a portion of the hardware resources and can access, via the first operating system, the hardware resources including hardware resources that the second to N-th operating systems can not directly access.

15. The image forming apparatus according to claim 1, wherein
the control unit realizes the outputting of the printer unit by executing a printer driver that operates on at least one of the second to N-th operating systems to control the printer unit.

16. The image forming apparatus according to claim 15, wherein
when data handled by the second to N-th operating systems is output in the image forming apparatus controlled by the first operating system, the data is input, as a job, to the image forming apparatus that is controlled by the first operating system through the printer driver.

17. The image forming apparatus according to claim 15, wherein
the printer driver is intended to be provided for used in a personal computer.

18. A method of controlling an image forming apparatus comprising
a printer unit that forms an image based on image data and outputs the image on a sheet; and a storage unit storing a first operating system and second to N-th (N is an integer of 2 or more) operating systems,
the method controlling hardware resources of the image forming apparatus including at least the printer unit and the storage unit by executing the first operating system that is activated on the image forming apparatus and a control program operating on the first operating system, the method comprising the steps of:
executing the second to N-th operating systems that activate at least one or more applications and an emulator that is disposed between the first operating system and the second to N-th operating systems to allow the second to N-th operating systems to operate on the first operating system; and
causing the first operating system to enter into a sleep mode, wherein
the first operating system is inhibited from entering into the sleep mode when at least one of the second to N-th operating systems is active, and the emulator emulates hardware on which the second to N-th operating systems operate.

19. The method of controlling the image forming apparatus according to claim 18, wherein
the second to N-th operating systems can activate at least one or more applications that handle data.

20. The method of controlling the image forming apparatus according to claim 19, wherein
the first operating system is inhibited from entering into the sleep mode when any one of the second to N-th operating systems is active and at least one or more of the applications is active.

21. The method of controlling the image forming apparatus according to claim 19, wherein
the first operating system is inhibited from entering into the sleep mode when any one of the second to N-th operating systems is active and at least one or more of the applications that are registered is active.

22. The method of controlling the image forming apparatus according to claim 21, wherein
an engine of the printer unit is caused to enter into a sleep mode while maintaining the first operating system in the active state when any one of the second to N-th operating systems is active and only an application other than the registered applications among the applications is active.

23. The method of controlling the image forming apparatus according to claim 19, wherein
the first operating system is caused to enter into the sleep mode when any one of the second to N-th operating systems is active and the applications are not active.

24. The method of controlling the image forming apparatus according to claim 21, wherein
the image forming apparatus includes an operating unit that accepts an input operation, and
the applications are set and registered through the operating unit.

25. The method of controlling the image forming apparatus according to claim 18, wherein
an engine of the printer unit is caused to enter into a sleep mode when the first operating system enters into the sleep mode.

26. The method of controlling the image forming apparatus according to claim 18, wherein
the second to N-th operating systems can enter into a sleep mode.

27. The method of controlling the image forming apparatus according to claim 18, wherein
the image forming apparatus can enter a power saving mode in which an engine of the printer unit enters into a sleep mode without causing the first operating system to enter into the sleep mode.

28. The method of controlling the image forming apparatus according to claim 18, wherein
the control program allows or inhibits entering into the sleep mode.

29. The method of controlling the image forming apparatus according to claim 18, wherein
the first operating system is caused to enter into the sleep mode when predetermined conditions are satisfied and any one of the second to N-th operating systems is not operating.

30. The method of controlling the image forming apparatus according to claim 29, wherein
the predetermined conditions are a case where no operation has been performed on the image forming apparatus for a predetermined period in an idle state of no job.

31. The method of controlling the image forming apparatus according to claim 18, wherein
at least one of the second to N-th operating systems can directly access at least a portion of the hardware resources and can access, via the first operating system, the hardware resources including hardware resources that the second to N-th operating systems can not directly access.

32. The method of controlling the image forming apparatus according to claim 18, wherein
the outputting of the printer unit is realized by executing a printer driver that operates on at least one of the second to N-th operating systems to control the printer unit.

33. The method of controlling the image forming apparatus according to claim 32, wherein
when data handled by the second to N-th operating systems is output in the image forming apparatus controlled by the first operating system, the data is input, as a job, to the image forming apparatus that is controlled by the first operating system through the printer driver.

34. The method of controlling the image forming apparatus according to claim 32, wherein
the printer driver is intended to be provided for used in a personal computer.

\* \* \* \* \*